United States Patent
Guo

(10) Patent No.: US 7,130,663 B2
(45) Date of Patent: Oct. 31, 2006

(54) ADAPTIVE BEAM FORMING USING A FEEDBACK SIGNAL

(75) Inventor: Yingjie Jay Guo, Flackwell Heath (GB)

(73) Assignee: Fujitsu Limited, Kawasaki (JP)

(*) Notice: Subject to any disclaimer, the term of this patent is extended or adjusted under 35 U.S.C. 154(b) by 136 days.

(21) Appl. No.: 10/344,622

(22) PCT Filed: Aug. 14, 2001

(86) PCT No.: PCT/GB01/03632

§ 371 (c)(1),
(2), (4) Date: Feb. 12, 2003

(87) PCT Pub. No.: WO02/15432

PCT Pub. Date: Feb. 21, 2002

(65) Prior Publication Data

US 2004/0014429 A1    Jan. 22, 2004

(30) Foreign Application Priority Data

Aug. 15, 2000 (GB) ................... 0020088.1

(51) Int. Cl.
*H04B 1/38* (2006.01)
*H01Q 3/22* (2006.01)
*G01S 3/16* (2006.01)

(52) U.S. Cl. .................... 455/562.1; 342/368; 342/381

(58) Field of Classification Search ............. 455/277.1, 455/277.2, 283, 73–74, 550.1, 101, 103, 455/446, 515, 561–562, 115.1, 91, 130, 82, 455/575.7; 370/335–337, 342, 347; 342/367–368, 342/372, 381–384
See application file for complete search history.

(56) References Cited

U.S. PATENT DOCUMENTS 5,543,806 A * 8/1996 Wilkinson .................. 342/368

(Continued)

FOREIGN PATENT DOCUMENTS

EP          0 949 709 A1    10/1999

(Continued)

OTHER PUBLICATIONS

Raitola et al. Transmission Diversity in Wideband CDMA.IEEE 1999.

(Continued)

*Primary Examiner*—Binh K. Tieu
(74) *Attorney, Agent, or Firm*—Katten Muchin Rosenman LLP

(57) ABSTRACT

Transmitting apparatus (10) for transmitting a transmission signal to a receiving apparatus (12) is described. The transmitting apparatus (10) comprises means (30, 32, 34) for transmitting to the receiving apparatus a plurality of transmission beams in accordance with a transmission beam pattern, at least one of the beams carrying the transmission signal, each beam being distinguishable from the or each other beam, means (38, 40) for receiving from the receiving apparatus a feedback signal based on measures of the quality of the transmission beams received at the receiving apparatus, and means (36) for adjusting the transmission beam pattern in dependence on the feedback signal. Corresponding receiving apparatus, and corresponding methods are also described.

24 Claims, 10 Drawing Sheets

U.S. PATENT DOCUMENTS

| | | | |
|---|---|---|---|
| 5,634,199 A | | 5/1997 | Gerlach et al. |
| 5,642,122 A | * | 6/1997 | Lockie et al. ............... 343/881 |
| 5,894,598 A | | 4/1999 | Shoki |
| 5,966,169 A | * | 10/1999 | Bullis ........................ 348/81 |
| 6,101,399 A | * | 8/2000 | Raleigh et al. ............ 455/561 |
| 6,166,689 A | * | 12/2000 | Dickey et al. .............. 342/381 |
| 6,208,294 B1 | * | 3/2001 | Kobayakawa et al. ...... 342/373 |
| 6,665,545 B1 | * | 12/2003 | Raleigh et al. ........... 455/562.1 |
| 6,751,206 B1 | * | 6/2004 | Padovani et al. ........... 370/335 |
| 2004/0157646 A1 | * | 8/2004 | Raleigh et al. ........... 455/562.1 |

FOREIGN PATENT DOCUMENTS

| | | |
|---|---|---|
| GB | 2 317 786 | 4/1998 |
| GB | 2 318 914 | 5/1998 |
| GB | 2 335 575 | 9/1999 |
| GB | 2 344 221 | 5/2000 |
| GB | 2 353 437 | 2/2001 |
| WO | WO 98/42150 | 9/1998 |
| WO | WO 02/11311 A2 | 2/2002 |

OTHER PUBLICATIONS

TSG-HAN Working Group. Text Proposals for FB Mode Transmit Diversity TSG-HAN Working Group Meeting #6, Jul. 13-16.

Jongren et al. Combining Transmit Antenna Weights and Orthogonal Space-Time Block Codes by Utilizing Side Information. Signal, Systems and Computers, 1999 pp. 1562-1566.

3G TS 25.214 V3.3.0 Draft (Jun. 2000) Section 7 "Closed Loop Mode Transmit Diversity" 1999, pp. 29-36.

Bernhard H. Walke Mobile Radio Networks Networking and Protocols. ISBN 0-471-97595-8 p. 321-363.

Guo et al. Advanced Base Station Technologies for UTRAN. Electronics & Communications Engineering Journal, Jun. 2000 pp. 123-132.

* cited by examiner

ADAPTIVE BEAM FORMING USING A FEEDBACK SIGNAL

RELATED APPLICATIONS

The present application is a 371 of PCT/JB01/03632 filed Aug. 14, 2001, which claims foreign priority from United Kingdom patent application number 0018859.9, filed 8/15/2000, which is incorporated by reference in its entirety, including any appendices and references thereto.

BACKGROUND OF INVENTION

1. Field of the Invention

The present invention relates to adaptive beam forming techniques for controlling the beam pattern of a transmission beam. In particular, but not exclusively, the present invention relates to adaptive beam forming techniques for use in the downlink of a mobile cellular communications system, and to hybrid transmit diversity and adaptive beam forming techniques.

2. Description of Related Art

In a cellular mobile communications system, the area in which the system is to operate is divided into a plurality of cells, each of which is served by a base station. Each base station is allocated a certain number of radio frequencies which are used to transmit signals to and receive signals from mobile units in the cell. Those radio frequencies are reused in other non-adjacent cells, thereby increasing the spectral efficiency of the system.

Within each cell, it is necessary for the base station to transmit to each wanted user (i.e. each active mobile station) in a multi-user and multi-path environment. In order to achieve satisfactory signal detection at low bit error rates, two conditions must be satisfied. Firstly, the power level of the signal received by the mobile unit from the base station must be greater than a certain threshold value. Secondly, the multi-user interference (MUI), sometimes referred to also as multiple access interference (MAI), must be reduced to an acceptable level.

In order to reduce MUI while keeping signal power levels above the threshold values, it is known to divide cells into a number of sectors, each of which is served by a directional antenna. For example a cell may be divided into three sectors by using three directional antennas spaced apart at angular intervals of 120°. In this way, when transmitting to mobile unit, a base station need only provide coverage for the sector in which the mobile unit is located, rather than the whole cell.

In the system described above there may still be many mobile units in a sector, which may lead to unacceptable levels of MUI. If an attempt were made to reduce the number of mobile units in any one sector by reducing the sector size, this would lead to an increase in the number of handovers from one sector to another which would need to be performed, which would reduce the efficiency of the system.

In an article by Y. J. Guo et al entitled "Advanced base station technologies for UTRAN", Electronics & Communications Engineering Journal, June 2000, the entire content of which is incorporated herein by reference, a technique for adaptive beam forming is disclosed, in which the beam pattern of a downlink transmission beam is adapted by determining the direction of reception of an uplink transmission beam. Since the downlink and uplink transmission beams may not have the same channel characteristics, for example because different frequencies are used for the uplink and the downlink, this technique may not always provide reliable results.

In order to overcome the problem of MUI in the uplink of a mobile communications system, it is known to employ adaptive antennas at base stations which spatially filter received signals. For example, United Kingdom patent application number 9826271.0 in the name of Fujitsu Limited, the entire content of which is incorporated herein by reference, discloses an adaptive antenna in which a beam former is used to spatially filter a transmission signal sent to a base station by a mobile unit. An adaption algorithm is employed which adjusts the beam former response in dependence on an error signal such that the beam former tracks the transmission signal of a particular mobile unit as the mobile unit moves within the cell.

If an adaptive antenna analogous to that described above were to be used in the downlink of a cellular mobile communications system, complex feedback information would have to be sent from the mobile unit to the base station, which would lead to an undesirable increase in the amount of information which would have to be transmitted in the uplink. Furthermore, the applicable standards for the system may not provided for the uplink transmission of such feedback information.

It is therefore desirable to provide an adaptive antenna suitable for use in the downlink of a cellular mobile communications system. In particular it is desirable to provide an adaptive antenna which avoids the need for complex feedback information to be transmitted from a mobile unit to a base station.

SUMMARY OF THE INVENTION

According to a first aspect of the present invention there is provided transmitting apparatus for transmitting a transmission signal to a receiving apparatus, comprising:

means for transmitting to the receiving apparatus a plurality of transmission beams in accordance with a transmission beam pattern, at least one of the beams carrying the transmission signal, each beam being distinguishable from the or each other beam;

means for receiving from the receiving apparatus a feedback signal based on measures of a quality of the transmission beams received at the receiving apparatus; and means for adjusting the transmission beam pattern in dependence on the feedback signal.

The present invention provides the advantage that simple feedback information may be used for adjusting the transmission beam pattern. Through the use of such a technique, a narrower transmission beam can be used than would otherwise be the case, which can allow the number of users in the system to be increased and/or multiuser interference to be reduced.

For example, the angular direction of the beam pattern may be adjusted in dependence on the feedback signal, which can allow the transmission beam pattern to adapt to relative movement between the transmitting apparatus and the receiving apparatus.

The feedback signal may have one of a limited number of states. By a limited number of states it may be meant, for example, that each state would lead to a different action (or lack of action) being taken by the transmitting apparatus. For example, the feedback signal may indicate one of rotate right or rotate left, or the feedback signal may identify one of the transmission beams, or it may rank the transmission beams in an order. For example, the feedback signal may identify which of the transmission beams was received with the best quality, or which was received with the worst quality. The transmitting apparatus may then act accordingly, for example by adjusting the transmission beam pattern in the direction of the beam that was received with the best quality or away from the beam that was received with the worst quality.

By arranging the feedback signal to have one of a limited number of states, the feedback signal can be made as simple as possible. For example, the feedback signal may comprise n bits, where the number of transmission beams is less than or equal to $2^n$. For example, if the feedback signal comprises one bit then two transmission beams may be used; if the feedback signal comprises two bits then up to four transmission beams may be used. The value of n may be equal to 1, 2, 3, 4 or more.

Alternatively, the feedback signal may comprise measures of the quality of each of the transmission beams. The measures may be absolute measures, or relative measures. For example, if two bits are available for feedback information, then a two bit measure of the absolute or relative quality of each of the transmission beams could be fed back on a time multiplex basis. The receiving means may thus be adapted to receive the quality measures for different beams at different times on a predetermined time division multiplexing basis.

The plurality of transmission beams may comprise a main beam carrying the transmission signal and at least one auxiliary beam having an angular direction offset from that of the main beam. By providing a main beam for carrying the transmission signal, it is possible to carry only a limited amount of information in the auxiliary beam, which may improve the performance of the system in comparison to the case where both beams carry the transmission signal. For example, the main beam may carry both a data channel and a control channel, while the auxiliary beam may carry just the control channel. This can allow the quality of the various transmission beams to be measured at the receiver by measuring the qualities of the received control channels, while avoiding the need to transmit the data channel in all transmission beams.

The adjusting means may be operable to adjust the angular direction of the beam pattern by a predetermined adjustment amount in the direction of an auxiliary beam when the feedback signal indicates that that auxiliary beam has best quality. Alternatively, the adjusting means may be operable to adjust the angular direction of the beam pattern by a predetermined adjustment amount away from an auxiliary beam when the feedback signal indicates that that auxiliary beam has worst quality.

The adjustment amount may be equal to the offset amount, and thus the adjusting means may be adapted to change the angular direction of the main beam to that of an auxiliary beam if the feedback signal indicates that the auxiliary beam was received with better quality than the main beam.

The adjusting means may maintain at least one transmission beam unchanged when making the adjustment to the transmission beam pattern. For example, all but one transmission beam may be unchanged. In this way the stability of the system may be improved, since it is not necessary to move all transmission beams. For example, one beam may be moved from one side of the plurality of transmission beams to the other side while the other beams remain where they are.

In order to achieve good control of the direction of the transmission beam pattern there are preferably two auxiliary beams substantially opposite each other, and thus a first auxiliary beam may be offset in a first direction by a first angular offset from the main beam and a second auxiliary beam may be offset in a second direction, opposite to the first direction, by a second angular offset from the main beam. By opposite it is preferably meant that the first and second auxiliary beams are more than 90° apart, for example at least 120° or around 180°. The first and second offsets may be the same or different. The adjusting means may be operable to adjust the angular direction of the beam pattern by a first adjustment amount in the first direction when the feedback signal indicates that the first auxiliary beam has best quality and by a second adjustment amount in the second direction when the feedback signal indicates that the second auxiliary beam has best quality.

In one implementation at least one of the auxiliary beams is transmitted continually. For example, the auxiliary beam may be transmitted in each time slot or in certain time slots, although not necessarily for the whole of the time slot. In another implementation the plurality of transmission beams comprises at least two auxiliary beams which are transmitted at different respective times. By transmitting at least two auxiliary beams at different times, a number of different trial directions can be tested over a period of time without increasing the number of auxiliary beams that are transmitted at any one time. The direction of the main beam may be changed to (or towards) that of an auxiliary beam at any time that the feedback signal indicates that the auxiliary beam was received with better quality than the main beam. This implementation might be appropriate where the amount of feedback information that can be transmitted is limited, or where it is desired to reduce the number of auxiliary beams that are transmitted at any one time, for example to reduce interference.

In the examples described above, the transmission signal is carried only in a main transmission beam. However, the transmission signal may be carried in more than one transmission beam, in which case the transmission signals in each beam may be adjusted on a maximum ratio basis. Thus the transmission signal may be carried in at least two transmission beams, and a characteristic of the transmission signals may be adjusted in dependence on the feedback signal. The characteristic may be, for example, magnitude or phase.

In the examples described above, reference has been made to adjusting the angular direction of the beam pattern in dependence on the feedback signal. In another example, an angular spread of the transmission beam pattern is adjusted in dependence on the feedback signal.

For example, the apparatus may be operable to perform a series of cycles, in which in a first cycle of the series the transmission beam pattern has a first angular spread, and in a second cycle of the series the transmission beam pattern has a second angular spread narrower than the first angular spread. In this way the angular spread of the transmission beam may be made narrower in dependence on the feedback signal. For example, in the first cycle, two broad transmission beams may be transmitted. A decision may then be taken as to which of the two broad beams was received with the best quality. Then, in the second cycle, two narrower beams may be transmitted, the two narrower beams having substantially the same coverage as the one broad beam that was judged to have been received with the best quality. In this way, where the initial direction of transmission is not known, transmission may start with relatively broad beams which are then narrowed in successive cycles until a sufficient degree of directionality has been achieved. Adjustment of the direction of the transmission beam pattern may then take place in accordance with the principles described above.

In any of the above implementations, each of the plurality of transmission beams may carry a control channel for use in measuring the quality of the transmission beam.

The apparatus may further comprise means for altering a signal to be carried by one of the transmission beams such that that transmission beam is distinguishable from the other transmission beam or beams. Various techniques may be used to make the various transmission beams distinguishable from each other. In one example the apparatus comprises means for scrambling at least two of the transmission beams with different scrambling codes. In this case the cross-correlation between the various codes is preferably low (for example the codes may be orthogonal), to make it easier to distinguish between the various beams. In another example the apparatus comprises means for inserting different pilot signals into the transmission signals. In this case the pilot sequences are preferably orthogonal. In a further example, certain data bits of a transmission frame are reserved for distinguishing between the various beams. In another example, the various transmission beams are sent with different time offsets. If the time offsets are sufficiently large, correlators at the receiving apparatus can distinguish between the various signals. These possibilities are given only as examples, and it will be appreciated that any technique that allows the various transmission beams to be distinguished from each other may be used.

The apparatus may further comprise a plurality of beam formers and a plurality of antenna elements for producing the plurality of transmission beams.

The invention extends to a transmit diversity apparatus comprising a plurality of transmit diversity branches for transmitting a transmission signal using a transmit diversity technique, in which at least one of the branches comprises transmitting apparatus as described above. In this way, either the best transmit diversity branch may be selected for transmitting the transmission signal, or the transmission signal may be transmitted simultaneously from at least two transmit diversity branches, and the apparatus may further comprise means for adjusting a characteristic (such as magnitude or phase) of transmission signals transmitted from the transmit diversity branches in dependence on the feedback signal, in order to improve the performance of the system.

The transmit diversity branches may transmit respective transmission beams and the feedback signal may comprise measures of the quality the transmission beams. The receiving means may then be adapted to receive the quality measures for different beams at different times on a predetermined time division multiplexing basis.

At least one of the diversity branches may transmit a main transmission beam and an auxiliary transmission beam, and the receiving means of that branch may be adapted to receive a measure of the quality of the main transmission beam more frequently than a measure of the quality of the auxiliary beam. Since in a mobile communications system the speed with which an mobile unit moves may be lower than the fading speed of a transmission channel, this may provide a convenient and efficient way of feeding back information for both transmit diversity and beam forming The invention extends to a base station for use in a cellular mobile communications system comprising apparatus in any of the forms described above. The base station may also include one or more beam farmers for spatially filtering received signals. Preferably the base station includes receiving apparatus as described in co-pending United Kingdom patent application number 0018859.9 in the name of Fujitsu Limited, the entire content of which is incorporated herein by reference.

The invention also extends to receiving apparatus for use with the transmitting apparatus described above, and thus according to another aspect of the invention there is provided receiving apparatus for receiving a transmission signal transmitted by a transmitting apparatus, comprising:
 means for receiving a plurality of transmission beams, at least one of the beams carrying the transmission signal, each beam being distinguishable from the or each other beam;
 means for producing measures of a quality of the transmission beams;
 means for producing a feedback signal based on the measures of the quality of the transmission beams; and
 means for transmitting the feedback signal from the receiving apparatus to the transmitting apparatus.

The feedback signal may have one of a limited number of states. For example, the feedback signal may indicate one of rotate right or rotate left, or the feedback signal may identify one of the transmission beams, or it may rank the transmission beams in an order. The feedback signal may comprise n bits, where the number of transmission beams is less than or equal to $2^n$.

Alternatively the feedback signal may comprise measures of the quality of each of the transmission beams received at the receiving apparatus. The measures for different beams may be time multiplexed.

The apparatus may further comprise means for distinguishing signals carried by different transmission beams. For example, the distinguishing means may comprise means for descrambling signals which have been scrambled with scrambling codes, or the distinguishing means may comprise means for distinguishing signals having different pilot signals.

The means for producing measures of the quality of the transmission beams may be adapted to estimate the signal-to-interference-and-noise ratio of received signals and/or the power level of received signals, or to measure the quality of the transmission beams in any other way.

The apparatus may be adapted to receive transmission signals transmitted in a plurality of transmission beams from a plurality of transmit diversity branches in the transmitting apparatus. The apparatus may then be adapted to combine the various signals, for example on a maximum ratio basis.

In the above case, the feedback signal may comprise measures of the quality of each of the transmission beams. The quality measures for different beams may be transmitted at different times on a predetermined time division multiplexing basis. For example, the apparatus may be adapted to receive at least a main transmission beam and an auxiliary transmission beam from at least one of the plurality of diversity branches, and to transmit a measure of the quality of the main transmission beam more frequently than a measure of the quality of the auxiliary beam.

The invention extends to a mobile unit for use in a cellular mobile communications system comprising receiving apparatus in any of the forms described above.

The invention also extends to a communications system comprising transmitting apparatus in any of the forms described above and receiving apparatus in any of the forms described above. The system may comprise more than one receiving apparatus (e.g. mobile units).

In another aspect of the present invention there is provided transmitting apparatus for transmitting a transmission signal to a receiving apparatus, comprising:
 an antenna array;
 a transmitter array connected to the antenna array;
 a beam former connected to the transmitter array, the beam former being operable to receive a transmission signal and to modify the transmission signal such that the antenna array produces a plurality of transmission beams in accordance with a transmission beam pattern, at least one of the transmission beams carrying the transmission signal;
 a receiver which in operation receives from the receiving apparatus a feedback signal based on measures of a quality of the transmission beams received at the receiving apparatus; and
 a processor programmed to control the beam former such that the transmission beam pattern is adjusted in dependence on the feedback signal.

In another aspect of the invention there is provided receiving apparatus for receiving a transmission signal transmitted by a transmitting apparatus, comprising:
 a receiver operable to receive a plurality of transmission beams, at least one of the beams carrying the transmission signal;
 a processor programmed to produce measures of a quality of the transmission beams and to produce a feedback signal based on the measures of the quality of the transmission beams; and
 a transmitter operable to transmit the feedback signal from the receiving apparatus to the transmitting apparatus.

Corresponding method aspects of the invention are provided, and thus in another aspect of the invention there is provided a method of transmitting a transmission signal from a transmitting apparatus to a receiving apparatus, comprising:
 transmitting from the transmitting apparatus to the receiving apparatus a plurality of transmission beams in accordance with a transmission beam pattern, at least one of the beams carrying the transmission signal, each beam being distinguishable from the or each other beam;
 receiving the plurality of transmission beams;
 producing measures of the quality of the transmission beams;
 producing a feedback signal based on the measure of the quality of the transmission beams;
 transmitting the feedback signal from the receiving apparatus to the transmitting apparatus; and
 adjusting the transmission beam pattern in dependence on the feedback signal.

Any of the apparatus features may be applied to the method aspect of the invention and vice versa. Features of one aspect may be applied to any other aspect.

In any of the above aspects the various features may be implemented in hardware, or as software modules running on one or more processors.

The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

BRIEF DESCRIPTION OF DRAWINGS

Preferred features of the present invention will now be described, purely by way of example, with reference to the accompanying drawings, in which.

DETAILED DESCRIPTION OF THE INVENTION

Overview of a Mobile Cellular Communications System

Figure 1:
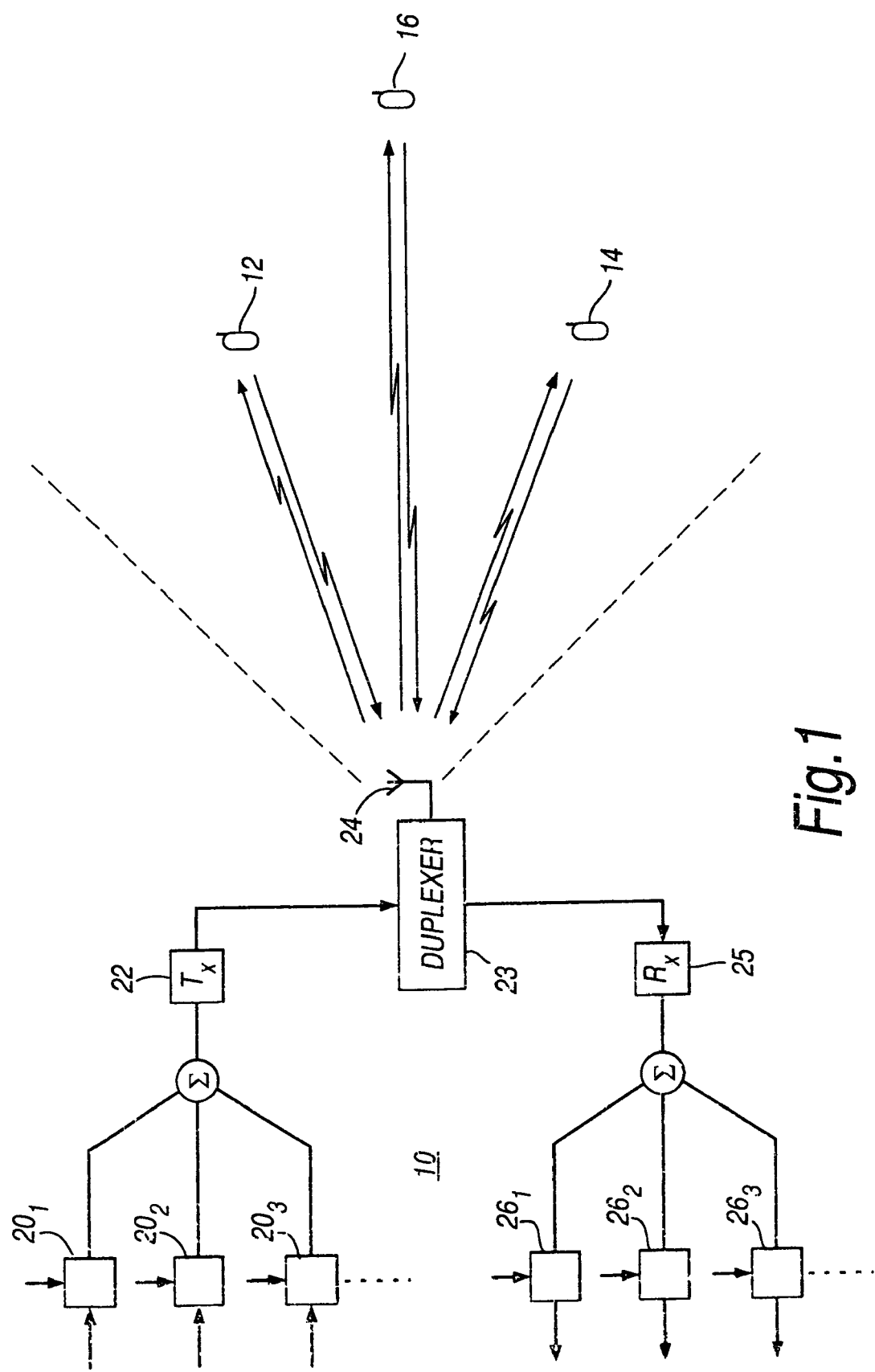
FIG. 1 shows an overview of a mobile cellular communications system.

An overview of a mobile cellular communications system is shown in FIG. 1. The system is designed in particular for use with the proposed FDD (Frequency Division Duplexing) mode of the UMTS (Universal Mobile Telecommunications System) Terrestrial Access Network (UTRA) standard. Further details of the proposed UTRA standard may be found in "Mobile Radio Networks Networking and Protocols" by Bernhard Walke, ISBN 0-471-97595-8, the entire content of which is incorporated herein by reference.

Referring to FIG. 1, base station 10 transmits signals to and receives signals from a plurality of mobile units 12, 14, 16, which are typically mobile telephones or portable data processing devices. The various mobile units are located within a 120° sector, as delimited by the dashed lines. The various signals to and from the base station are transmitted in the same frequency band using code division multiple access (CDMA). In CDMA, each signal is spread over a wide spectrum at the transmitter using a unique spreading code. At the receiver, the signal is despread back to the original signal using a replica of the spreading code. By using a different spreading code (or a different combination of spreading and scrambling codes) for each signal, the various signals are distinguishable despite being transmitted simultaneously in the same frequency band.

Base station 10 comprises spreaders $20_1$, $20_2$, $20_3$, transmitter 22, duplexer 23, antenna 24, receiver 25, and despreaders $26_1$, $26_2$, $26_3$. In operation, transmission signals for transmission to each of the mobile units are fed to spreaders $20_1$, $20_2$, $20_3$. Spreaders $20_1$, $20_2$, $20_3$ spread each of the transmission signals from a narrow-band signal to a wide-band signal using a unique spreading code. The various spread signals are then combined and transmitted by transmitter 22 and antenna 24. Transmission from the base station to a mobile unit is referred to herein as downlink transmission.

At each of the mobile units 12, 14, 16, a corresponding despreader (not shown) despreads the received signal back to the original narrow-band signal using a replica of the original spreading code, so as to reproduce the original transmission signal. Each of the mobile units also transmits a transmission signal to the base station, which transmission signal is spread by a unique spreading code in a similar way to downlink transmission signals. Transmission from a mobile unit to the base station is referred to herein as uplink transmission.

The signals received at the base station from the various mobile units via antenna 24 and receiver 25 are fed to despreaders $26_1$, $26_2$, $26_3$. The despreaders despread the received signals back to the original narrow-band signals from the various mobile units. In practice, a RAKE receiver, having a plurality of despreaders and a combiner, may be used instead of a simple despreader to exploit the fact that transmission may take place via several paths. In addition, the received beam patterns may be adapted using beam formers in the receiver. Preferably, the receiving apparatus of the base station is as described in co-pending United Kingdom patent application number 0018859.9 cited above.

In the downlink of the system shown in FIG. 1, a physical channel is identified by its frequency and its spreading code. Data and control information are transmitted using the same physical channel using time-division-multiplexing (TDM). In the uplink, through the use of Quadrature Phase Shift Keying, different information is transmitted on the I—(in phase) and Q—(quadrature) branches, so that in the uplink direction a physical channel is identified by its frequency, spreading code, and relative phase (0 or $\pi/2$). In the uplink, data and control information are transmitted separately in the I— and Q—branches respectively.

Figure 2:
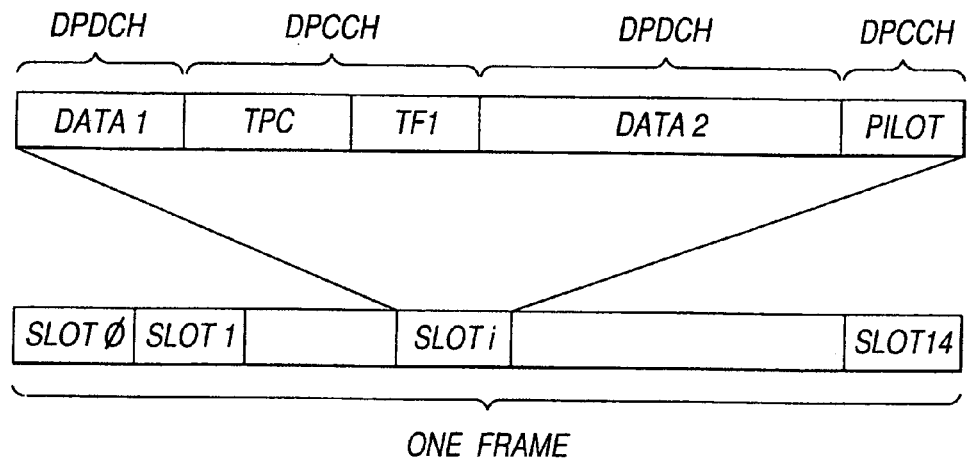
FIG. 2 shows a proposed frame structure of a downlink physical channel.

FIG. 2 shows a proposed frame structure of a downlink physical channel. Referring to FIG. 2, each frame of duration 10 ms is split into 15 slots, each corresponding to one power control period. Each slot comprises a first set of data bits (DATA 1), transmit power control (TPC) bits, transport format indicator (TFI) bits, a second set of data bits (DATA 2), and pilot bits (PILOT). The data bits are used for the transmission of data from the base station to the mobile unit. The power control bits are used to control the transmission power of the mobile unit based on a measure the strength of the signal received by the base station. The transport format indicator bits (which are optional) are used to describe the instantaneous parameters of the different transport channels on the dedicated physical data channel. The pilot bits are predetermined bits which are used, for example, for channel estimation. The first and second set of data bits in combination form a downlink dedicated physical data channel (DPDCH), while the TPC, TFI and pilot bits in combination form a downlink dedicated physical control channel (DPCCH).

Figure 3:
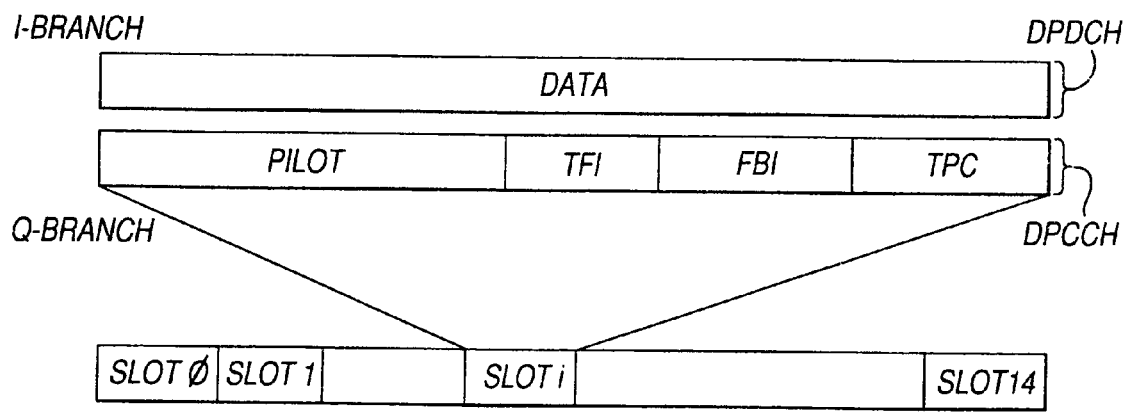
FIG. 3 shows a proposed frame structure of an uplink physical channel.

FIG. 3 shows a proposes frame structure of an uplink physical channel. Referring to FIG. 3, the uplink dedicated physical data channel (uplink DPDCH) and uplink dedicated physical control channel (uplink DPCCH) are I/Q multiplexed within each radio frame so that the two channels are provided simultaneously. The DPDCH is used to carry data while the DPCCH is used to carry control information. The DPCCH consists of pilot bits (PILOT) for channel estimation, transport format indicator (TFI) bits (optional), feedback information (FBI) bits and transmit power control (TPC) bits. The feedback information bits are used to support techniques which require feedback between the mobile unit and the base station. Such techniques include closed loop mode transmit diversity and site selection diversity. As will be described later, the feedback information bits may also be used in embodiments of the present invention to implement adaptive antenna techniques.

Figure 4:
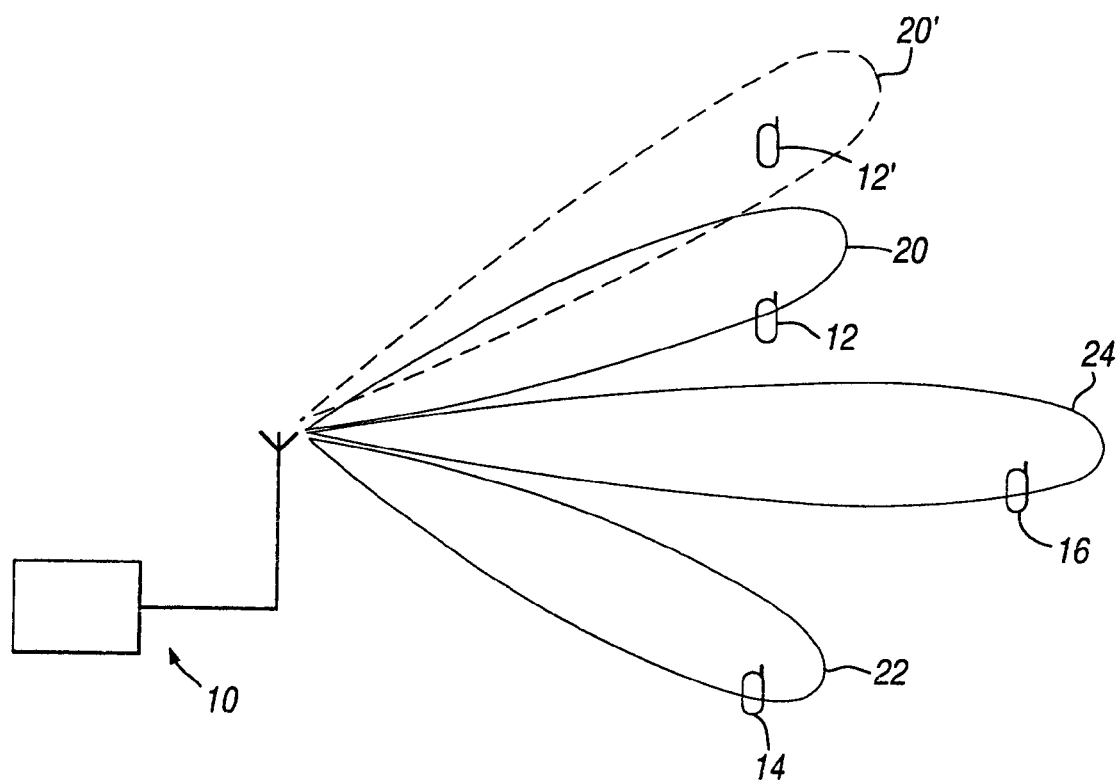
FIG. 4 illustrates a principle of adaptive directional transmission beam patterns.

FIG. 4 illustrates the principle of adaptive directional transmission beams in a mobile communications system. In FIG. 4, base station 10 transmits signals to mobile units 12, 14, 16 using transmission beam patterns 20, 22 and 24 respectively. Each transmission beam pattern is produced by using an array of individual antenna elements provided at the base station to transmit different respective amplitude and/or phase adjusted versions of the transmission signal to be sent to the mobile unit concerned. The transmission beam patterns are directional, so that each transmission beam pattern points towards the corresponding mobile unit. Furthermore, the power of each transmission beam pattern is adjusted so that the range of the beam is sufficient to allow communication with the corresponding mobile unit, without using excessive transmission power. As the mobile units 12, 14, 16 roam within the area of coverage of the base station 10, the direction and power of the transmission beam patterns 20, 22, 24 are controlled adaptively to ensure that the mobile units remain within the corresponding transmission beams. For example, if the mobile unit 12 moves to a location indicated by 12', then it will no longer be within the area of coverage of transmission beam pattern 20. In this case, the direction of transmission beam pattern 20 must be adapted as the mobile unit 12 moves, as indicated by the dashed transmission beam pattern 20', to ensure continuous coverage.

The use of adaptive directional transmission beam patterns as described above provides a number of advantages. Firstly, through the use of a directional beam pattern, the overall transmission power of the base station can be reduced in comparison to the case where non-directional beam patterns are used, which results in more efficient use of the base station. secondly, since directional transmission beam patterns are less likely to interfere with each other, multiuser interference between signals for the various mobile units is reduced, and the number of mobile units that can be accommodated by the base station can be increased. By adapting the direction of the beam pattern as the mobile unit moves, the directional beam patterns can be made narrower than would otherwise be the case, allowing further reductions in overall transmission power and multiuser interference.

Further background to the use of adaptive antennas can be found in the article by Y. J. Guo et al cited above.

Figure 5:
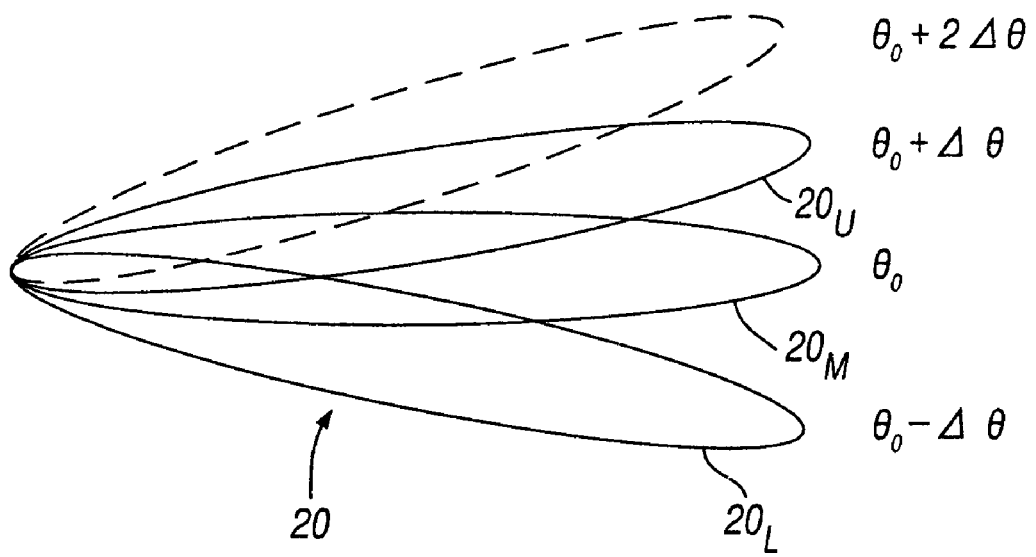
FIG. 5 illustrates a technique for adapting the direction of a transmission beam pattern embodying the present invention.

A method of adapting the direction of a transmission beam pattern embodying the present invention will now be described with reference to FIG. 5. Referring to FIG. 5, it is assumed that a transmission beam pattern, for example transmission beam pattern 20, comprises three adjacent transmission beams: a middle beam $20_M$ having an angular direction $\theta_0$; a lower beam $20_L$ having an angular direction $\theta_0 - \Delta\theta$; and an upper beam $20_U$ having an angular direction $\theta_0 + \Delta\theta$. The angular direction $\theta_0$ of the middle beam $20_M$ is referred to herein as the pointing direction of the transmission beam pattern 20. Each of the three transmission beams $20_M$, $20_L$, $20_U$ has some distinctive characteristic, such that the three beams are distinguishable from one another. In this example, the three beams $20_M$, $20_L$, $20_U$ are transmitted from the base station 10 to the mobile unit 12 in FIG. 1.

At the mobile unit 12, a quality of each of the received beams $20_M$, $20_L$, $20_U$ is measured, and the respective quality measures are compared to judge which beam was received with the best quality. This judgement result is fed back to the base station 10 as a feedback signal. Based on the feedback signal, a decision can be made as to whether the point direction of the transmission beam pattern needs to be changed. The point direction of the transmission beam pattern is then updated, if necessary, such that the transmission beam pattern continues to point at the mobile unit even if the mobile unit moves.

In the example shown in FIG. 5, the feedback signal will indicate one of three situations:
  (i) the middle beam $20_M$ is judged to have been received with the best quality
  (ii) the lower beam $20_L$ is judged to have been received with the best quality, or
  (iii) the upper beam $20_U$ is judged to have been received with the best quality.

In dependence on which of the three situations is indicated by the feedback signal, one of three options is taken for adjusting the transmission beam pattern 20:
  (i) if the feedback signal indicates that the middle beam $20_M$ has been received with the best quality, the angle of the pointing direction is unchanged
  (ii) if the feedback signal indicates that the lower beam $20_L$ has been received with the best quality, the angle of the pointing direction is decreased by $\Delta\theta$
  (iii) if the feedback signal indicates that the upper beam $20_U$ has been received with the best quality, the angle of the pointing direction is increased by $\Delta\theta$.

Thus, in dependence on the feedback signal, the transmission beam pattern either stays the same, or is shifted up or down by an amount $\Delta\theta$. For example, if the upper beam $20_U$ is judged to have been received with the best quality, the upper beam is moved to $\theta_0+2\Delta\theta$ (as indicated by the dashed line in FIG. 5), the middle beam is moved to $\theta_0+\Delta\theta$ and the lower beam is moved to $\theta_0$.

Although conceptually when the transmission beam pattern changes, the angular direction of each beam is changed by $\Delta\theta$, in practice two out of the three beam are unchanged, and only one beam is changed by an amount $3\Delta\theta$. For example, in FIG. 5 the upper and middle beams would remain unchanged, and the lower beam moved by $3\Delta\theta$ to $\theta_0+2\Delta\theta$. Since in this version of the method two of the three beam are preserved, stability is improved.

Alternatively, when the pointing direction is changed, this may be done by an amount greater than or smaller than $\Delta\theta$, that is, the middle beam may move to a position that is different from the position of either the upper or lower beam. For example, it might be preferred to change the pointing direction in steps of less than $\Delta\theta$ so that the pointing direction changes gradually. The pointing direction may change by different amounts in different directions.

While reference has been made to middle, upper and lower beams, it will be appreciated that this terminology is used for purposes of explanation only, and that in practice the three transmission beams may be spaced horizontally or in any other arrangement.

First Embodiment of Communication System

Figure 6:
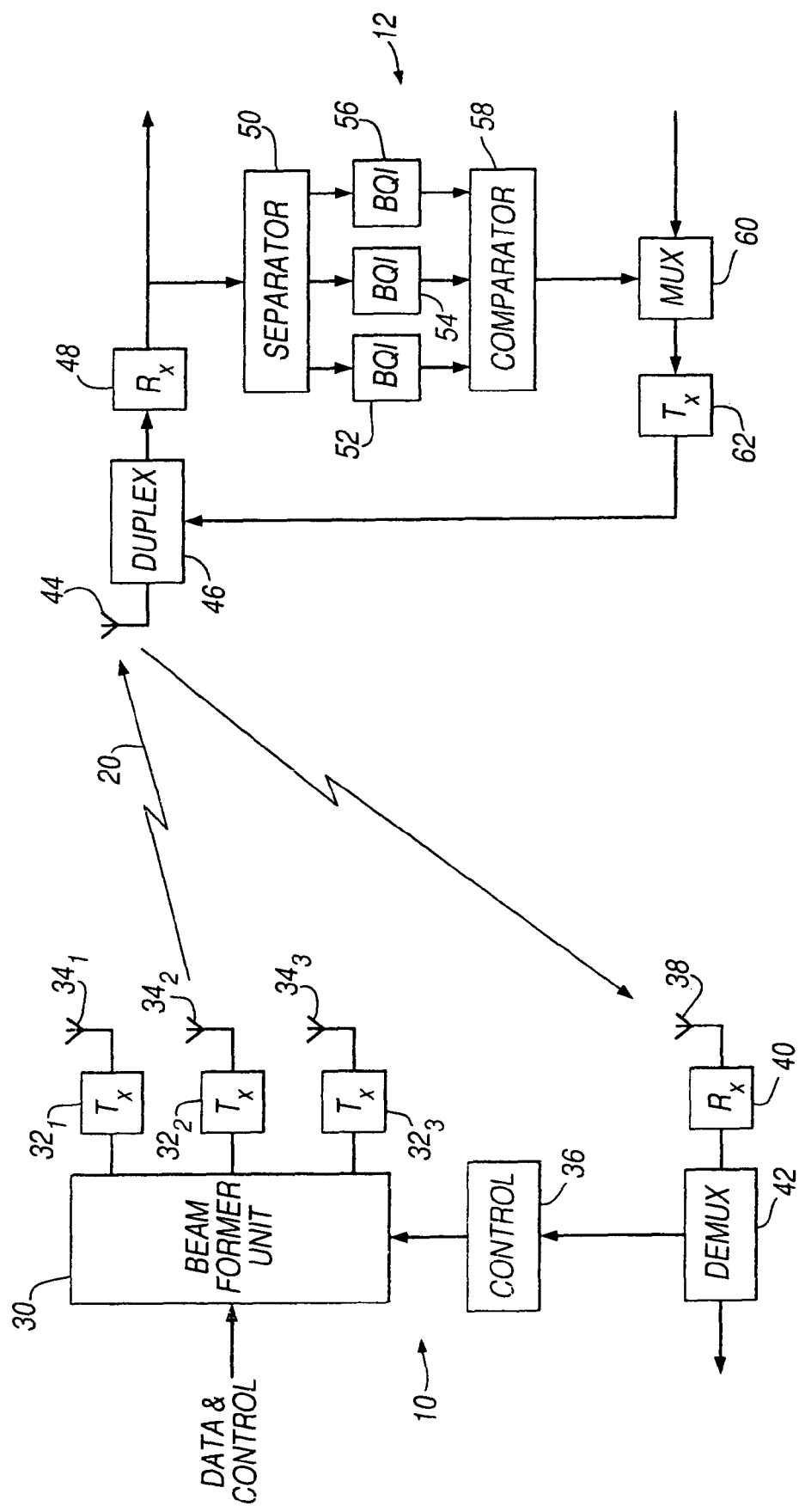
FIG. 6 shows parts of a mobile communications system according to a first embodiment of the invention.

A mobile communication system according to a first embodiment of the present invention is shown in FIG. 6. In FIG. 6, base station 10 and mobile unit 12 cooperate to control the direction of a transmission beam 20 which is transmitted from the base station to the mobile unit. Base station 10 comprises beam former unit 30, transmitters $32_1$, $32_2$, $32_3$, antenna elements $34_1$, $34_2$, $34_3$, beam former control unit 36, receiving antenna 38, receiver 40 and demultiplexer 42. Mobile unit 12 comprises antenna 44, duplexer 46, receiver 48, beam separator 50, beam quality indicators (BQIs) 52, 54, 56, comparator 58, multiplexer 60 and transmitter 62.

In operation, beam former unit 30 receives a signal for transmission to mobile unit 12 and modifies the signal in accordance with a control signal from beam former control unit 36 to produce antenna signals. The operation of the beam former unit 30 is described later in detail with reference to FIG. 7. The antenna signals output by the beam former unit are fed to transmitters $32_1$, $32_2$, $32_3$ which convert the antenna signals from the beam former unit into radio frequency signals for transmission by antenna elements $34_1$, $34_2$, $34_3$. The antenna elements $34_1$, $34_2$, $34_3$ are arranged physically in a spaced relationship to form an antenna array at the base station 10. The beam former unit 30 modifies the signal at its input such that, when the signal is transmitted by transmitters $32_1$, $32_2$, $32_3$ and antenna elements $34_1$, $34_2$, $34_3$, directional transmission beams $20_M$, $20_L$, $20_U$ are produced. Each of the three transmission beams $20_M$, $20_L$, $20_U$ has some distinctive characteristic, such that the three beams are distinguishable from one another at the receiving mobile unit 12. The three beams $20_M$, $20_L$, $20_U$ are transmitted from the base station 10 to the mobile unit 12.

At the mobile unit 12 the three beams $20_M$, $20_L$, $20_U$ are received by antenna 44 and passed to duplexer 46, which enables antenna 44 to be used for both transmitting and receiving radio frequency signals. The radio frequency signals received by antenna 44 are passed to receiver 48, which down-converts the signals to an intermediate frequency or baseband, and digitizes the down-converted signals. The received signals are then passed to separator 50 which separates the signals representing each of the three beams, using the distinctive characteristic of each beam, to produce three separated received signals. The separated received signals are fed to respective beam quality indicators 52, 54, 56. Each beam quality indicator produces a measure of the quality of the signals transmitted by the corresponding beam. Any suitable measure of quality can be produced. For example, a received signal strength (RSS) or power measure, a bit error rate or frame error rate measure (FER) measure, or a signal-to-interference-and-noise ratio (SINR) measure. The measure for the middle beam could be a transmission power control (TCP) bit generated in the mobile unit for downlink power control purposes. Also, any of the measures could be basd on a history or average of measurements taken over several measurement periods (e.g. time slots) to avoid possible instability when two or more of the beams have approximately the same instantaneous quality. The measures produced by the beam quality indicators 52, 54, 56 are fed to comparator 58. Comparator 58 compares the quality measures produced by beam quality indicators 52, 54, 56 and outputs a signal indicating which of the three beams $20_M$, $20_L$, $20_U$ is judged to have been received with the best quality. The output of comparator 58 is fed to multiplexer 60 to be inserted as a feedback signal into an uplink signal for transmission from the mobile unit 12 to the base station 10.

At the base station 10, the uplink signal transmitted from the mobile unit 12 is received by antenna 38 and processed by receiver 40 to produce a received signal. The received signal is passed to demultiplexer 42 which separates out the feedback signal produced by comparator 58 in mobile unit 12. The feedback signal is then passed to beam former control unit 36. The beam former control unit 36 produces a control signal for the beam former unit 30 in dependence on the feedback signal. The beam former unit 30 then adjusts the point direction of transmission beams $20_M$, $20_L$, $20_U$ in dependence on control signal so as to optimise the performance of the system.

For example, if the transmission beam pattern shown in FIG. 5 is used in the FIG. 6 embodiment then, if the feedback signal indicates that the middle beam $20_M$ was received with the best quality, the point direction of the transmission beams is not changed; if the feedback signal indicates that the lower beam was received with the best quality, the point direction is decreased by an angle $\Delta\theta$; and if the feedback signal indicates that the upper beam was received with the best quality, the point direction is increased by an angle $\Delta\theta$.

In FIG. 6 a transmission antenna array separate from a reception antenna or antenna array is shown in order to simplify the explanation. In practice, a common antenna array may be used for transmission and reception, and the incoming and outgoing signals separated by a duplexer.

In the FIG. 6 embodiment it will be apparent that the feedback signal need only consist of two bits, since only two bits are required to indicate which of the three transmission beams was received with the best quality. Thus the amount of feedback information which is required to be sent from the mobile unit to the base station for the purposes of adaptive beam forming is kept low.

When implementing the present embodiment, the frame format shown in FIG. 3 may be used for the uplink transmission, and the feedback signal may be contained in the feedback information bits FBI. Since the number of bits which are available for feedback information per time slot in the frame structure shown in FIG. 3 is typically limited to two, this embodiment allows adaptive directional beam forming to be implemented with a feedback signal per time slot without altering the frame structure.

In the downlink, the frame format shown in FIG. 2 may be used. The pilot bits contained in the control channel may be used for measuring the quality of the received signals in the beam quality indicators 52, 54, 56. In that case, the middle transmission beam $20_M$ may provide both the data channel and the control channel, while the lower transmission beam $20_L$ and the upper transmission beam $20_U$ may provide only the control channel. Thus, the data channel is only provided by the transmission beam which was previously judged to have been received with the best quality, while the control channel is provided by all transmission beams in order to obtain estimates of the received beam quality. In this way, only a limited amount of information is transmitted in the upper and lower beams, which reduces the interference to other users. IF desired, the amount of information transmitted by the upper and lower beams could be reduced even further, for example by transmitting only the pilot bits.

Alternatively, both the data channel and the control channel may be transmitted in each transmission beam. In this case, the mobile unit might combine the various data channels using maximum ratio combining, in which each received data channel is given a weighting (that is, its magnitude and/or phase is adjusted) in dependence on the estimated quality of the transmission beam. Alternatively, an indication of the relative quality of each of the transmission beams may be sent from the mobile unit to the base station, and the base station may adjust the magnitude and/or phase of each data channel in dependence on the indication of the relative quality of the corresponding transmission beam. This might be appropriate if extra feedback bits are available, or if the beam quality indicators are fed back on a time multiplex basis. The time multiplexing of beam quality indicators is discussed below with reference to the second embodiment.

Various techniques may be used to distinguish the various transmission beams $20_M$, $20_L$, $20_U$ and to allow the signals contained therein to be separated in separator 50. In a cellular mobile communications system different scrambling codes may be used in different cells, with, say, eight scrambling codes being allocated to each cell. These scrambling codes can be exploited to distinguish between the various beams. Thus, in one example, the signal contained in each transmission beam is scrambled at the base station 10 using a different scrambling code. In this example, the separator 50 uses replicas of the various scrambling codes to descramble the signals and thereby to separate the signals contained in the various transmission beams. In another example, different pilot signals are used in the control channels of the various transmission beams. In a further example, the spreading code used for CDMA may be different for each transmission beam. In a further example, certain data bits of a transmission frame are reserved for distinguishing between the various beams. These possibilities are given only as examples, and it will be appreciated that any technique that allows the various transmission beams to be distinguished from each other may be used.

The distinguishing features of the various transmission beams may be decided in advance by the base station and transmitted to the mobile unit. For example, the base station may decide that that a scrambling code $SC_1$ is allocated to transmission beam $20_U$, a scrambling code $SC_2$ is allocated to transmission beam $20_M$, and a scrambling code $SC_3$ is allocated to transmission beam $20_L$. The same scrambling codes may be reused for each mobile unit, with transmission beams for different mobile units being distinguished by their spreading codes. In this case, a broadcast channel which is used for synchronising all mobile units could also be used to inform the mobile units of which scrambling codes are to be used. Alternatively, the scrambling codes which are to be used could be transmitted separately to each mobile unit at the start of transmission.

Figure 7:
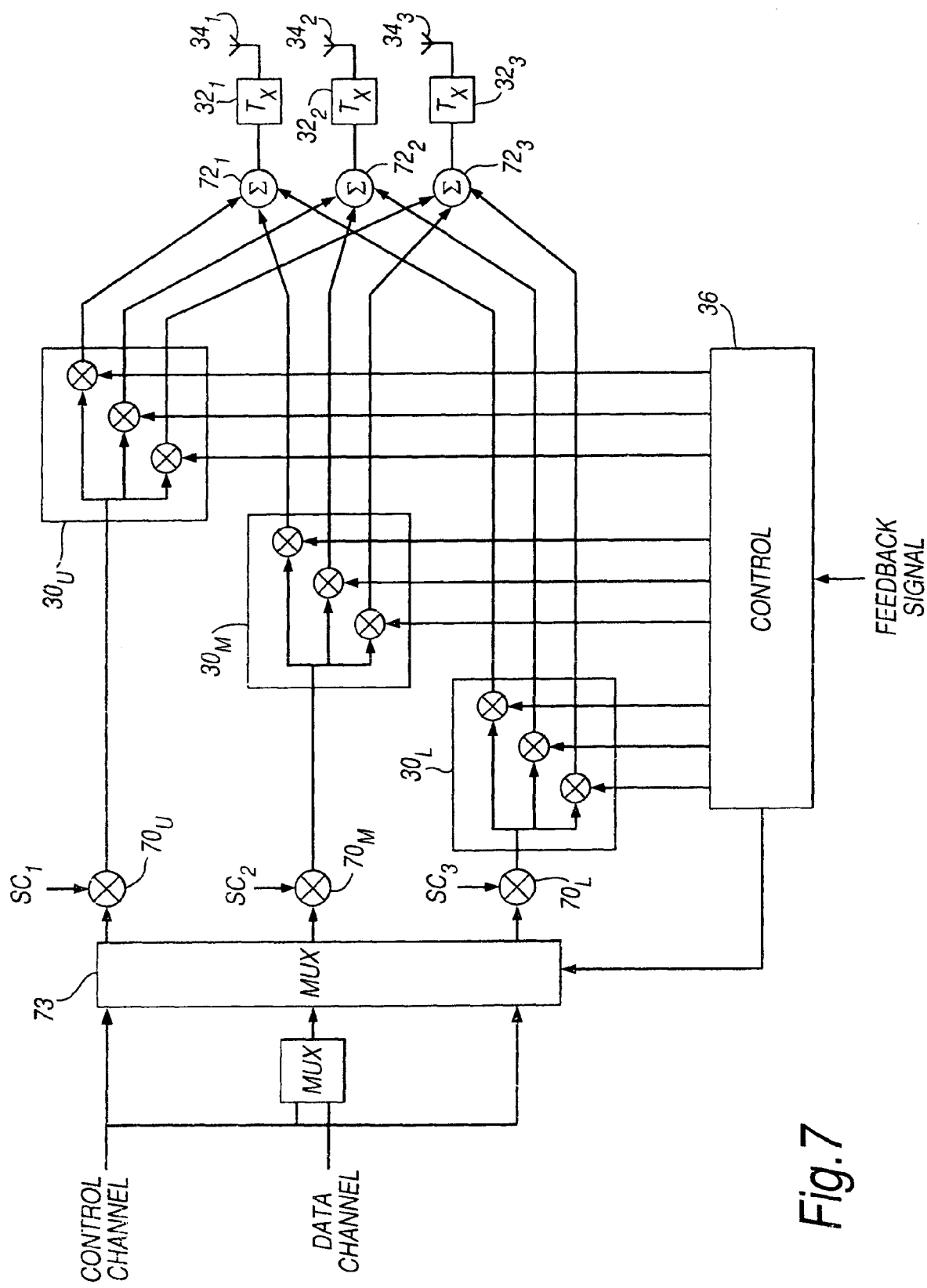
FIG. 7 is a block diagram of parts of a transmitting apparatus in the first embodiment of the invention.

Details of a transmitting apparatus for use in the base station of the first embodiment are shown in FIG. 7. Referring to FIG. 7 the transmitting apparatus comprises multiplexer 68, multipliers $70_L$, $70_M$, $70_U$, beam formers $30_L$, $30_M$, $30_U$, summers $72_1$, $72_2$, $72_3$, transmitters $32_1$, $32_2$, $32_3$, antenna elements $34_1$, $34_2$, $34_3$ and beam former control circuitry 36. Optionally, a routing unit 73 may be provided, as explained later.

In operation the transmitting apparatus takes as inputs a control channel and a data channel destined for a mobile unit. The control channel and data channel are multiplexed in multiplexer 68 to yield a multiplexed control and data channel. The control channel is fed to multipliers $70_U$ and $70_L$ while the multiplexed channel is fed to multiplier $70_M$. Each of the multipliers $70_U$, $70_M$, $70_L$ scrambles the signal at its input with a respective scrambling code $SC_1$, $SC_2$, $SC_3$. The scrambling code for each signal is different, so that the various signals are distinguishable from each other. The outputs of the multipliers are fed to respective beam formers $30_U$, $30_M$, $30_L$. Each beam former is provided to produce one of the directional beams $20_U$, $20_M$, $20_L$.

Within each beam former, a set of three multipliers is provided to multiply the input signal by three complex weight values. The complex weight values are set by the beam former control unit 36. By appropriate adjustment of the complex weight values within each, beam former, directional transmission beams $20_U$, $20_M$, $20_L$ are output from antenna elements $34_1$, $34_2$, $34_3$.

As an example, if a particular point direction θ is specified for one of the beam formers (where θ is the angle from the normal), then the beam former weights W are set as follows:

$$W = (1, e^{jkl\ \sin\theta}, e^{j2kl\ \sin\theta}, \ldots e^{j(N-1)kl\ \sin\theta})^T$$

where k=2π/λ, 1 is the distance between antenna elements and N is the number of antenna elements.

Beam former control unit 36 operates in dependence on the feedback signal fed back from the mobile unit to the base station. If the feedback signal indicates that the middle beam $20_M$ has been received with the best quality, the weights of the beam formers $30_U$, $30_M$, $30_L$ are not changed. If the feedback signal indicates that the upper beam $20_U$ has been received with the best quality, the weights of the beam formers $30_U$, $30_M$, $30_L$ are changed so that the point direction of the three transmission beams increases by Δθ. If the feedback signal indicates that the lower beam $20_L$ has been received with the best quality, the weights of the beam formers $30_U$, $30_M$, $30_L$ are changed so that the point direction of the three transmission beams decreases by Δθ.

It is advantageous, as mentioned above, that if the point direction of the three beams is to be changed by Δθ, two of the beams remain unchanged and the other beam changes by 3Δθ. To facilitate this, the routing unit 73 enables the inputs to the beam formers to be changed so that the middle beam always carries the multiplexed data and control channels, while the upper and lower beams carry only the control channel. The routing unit 73 receives a signal from beam former control unit 36 and reroutes the inputs to the multipliers $70_U$, $70_M$, $70_K$ in dependence on that signal so that the multiplexed data and control channel is always fed to the beam former which produces the middle transmission beam. The beam formers $30_U$, $30_M$, $30_K$ and multipliers $70_U$, $70_M$, $70_K$ are then no longer reserved for the upper, lower and middle beams, respectively, and each can be reallocated as appropriate to produce any one of the beams.

As mentioned above, in the present embodiment the feedback signal may consist of only two feedback bits. In certain circumstances, for example where other feedback information is transmitted in the FBI bits, it may be desirable to limit the number of feedback bits for adaptive beam forming to one. An alternative technique of adapting the direction of the transmission beam, in which only one feedback bit is required, will now be described with reference to FIG. 8.

Figure 8:
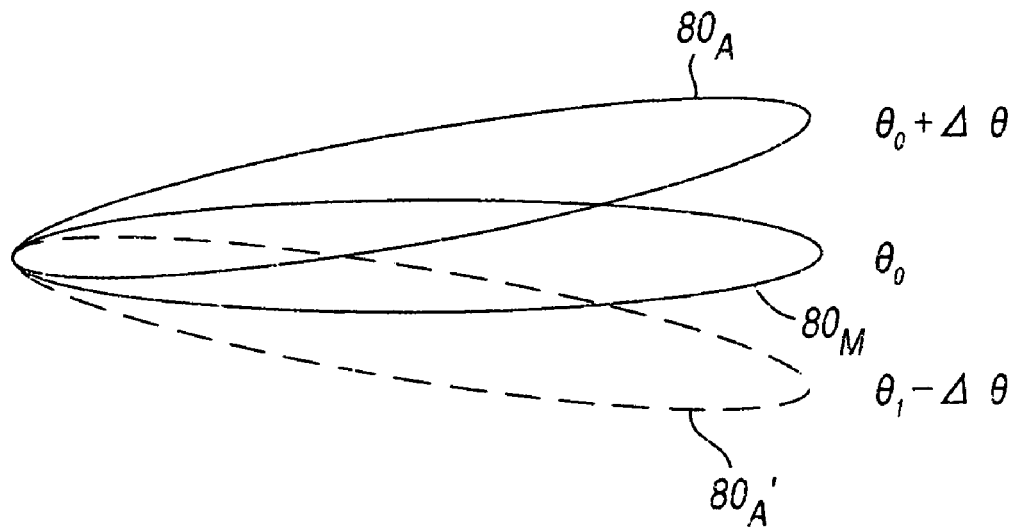
FIG. 8 illustrates an alternative technique for adapting the direction of a transmission beam pattern embodying the present invention.

Referring to FIG. 8, it is assumed that transmission beam pattern 80 comprises two adjacent transmission beams: main beam $80_M$ having an angular direction $\theta_0$, and auxiliary beam $80_A$ having an angular direction $\theta_0+\Delta\theta$. Here, the angular direction $\theta_0$ of the main beam $80_M$ is referred to as the pointing direction. The main beam is assumed to carry both data and control channels, while the auxiliary beam carries only the control channel. Each of the two transmission beams $80_M$, $80_A$ has some distinctive characteristic, such that the two beams are distinguishable from one another.

In the present technique, the base station and mobile unit operate in a series of cycles. In a first cycle of the series, the mobile unit determines which of the main beam and the auxiliary beam is received with the best quality, and this information is fed back to the base station as a feedback signal. Since the feedback signal only needs to indicate which of the two beams is received with the best quality, the feedback signal may consist of a single bit. At the base station, the main beam moves to the position of the auxiliary beam if the feedback signal indicates that the auxiliary beam was received with the best quality; otherwise the main beam is unchanged.

In a second cycle of the series, the auxiliary beam is shifted so as to have an angular direction of $\theta_1-\Delta\theta$ (shown by $80_A'$ in FIG. 8) where $\theta_1$ is the new point direction of the main beam after the first cycle ($\theta_1=\theta_0$ or $\theta_0+\Delta\theta$). The mobile unit again determines which of the main beam and the auxiliary beam is received with the best quality, and this information is fed back to the base station as a feedback signal. At the base station, the main beam moves to the position of the auxiliary beam if the feedback signal indicates that the auxiliary beam was received with the best quality; otherwise the main beam is unchanged.

In the above technique the auxiliary beam alternates between being above and below the main beam. In this way, a single bit may be used for the feedback signal, and the number of downlink transmission beams may be reduced by one. Since the angular speed of movement of a mobile unit is generally slow in comparison to a time slot duration (667 μs), this technique can provide effective control of the transmission beam direction whilst imposing lower demands on the available bandwidth of the uplink signals.

The techniques described above rely on auxiliary beams being provided above and below the main beam, either on a permanent basis or on a time share basis. In practice, the number of auxiliary beams may be increased to three or more, to allow three or more different point directions to be tested. This may be achieved either by increasing the number of permanent auxiliary beams, or by increasing the number of time share auxiliary beams, or through a combination of the two. For example, three permanent auxiliary transmission beams could be arranged in a locus around the main beam, in which case the feedback signal would require two bits. Alternatively, a single auxiliary transmission beam could move on a time share basis between the three positions, in which case only a single feedback bit would be needed. In general, the number of auxiliary beams may be increased to a desired number by an appropriate combination of permanent and time share transmission beams.

In the above description it has been assumed that the initial point direction of a transmission beam is known. In practice, when transmission first begins, the initial point direction may not be known. A technique for establishing the initial point direction of a transmission beam will now be described with reference to FIGS. 9(a) and 9(b). It is assumed that the base station transmitter covers a 120° sector.

Figure 9A:
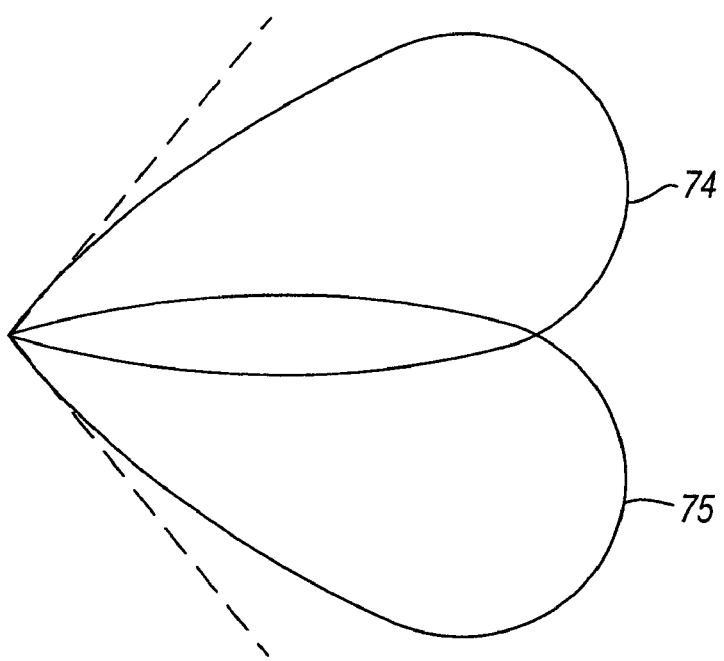
FIGS. 9a and 9b are schematic views illustrating a technique for establishing an initial point direction of a transmission beam pattern.

The technique for establishing the initial point direction operates in two stages. Referring to FIG. 9(a), in a first stage, two broad transmission beams 74, 75 are transmitted. The transmission beams 74, 75 have an angular spread of at least 60°, so that the entire 120° sector is covered by the two beams. The two beams are distinguishable from each other, for example through the use of different scrambling codes for each beam. A feedback signal indicating which of the two beams is received with the best quality is fed back from the mobile unit to the base station, in a similar way to that described above.

Figure 9B:
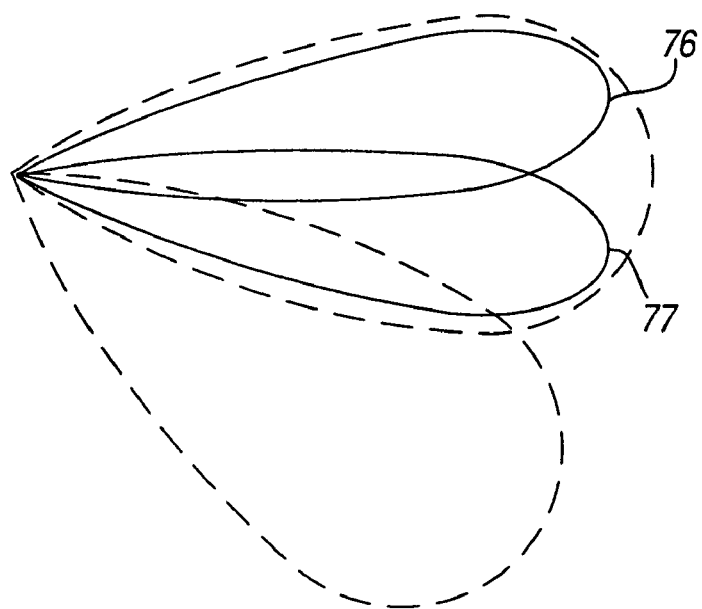

In a second stage, the transmitting apparatus decides which of the two transmission beams 74, 75 was received with the best quality based on the feedback signal. Two narrow transmission beams are then transmitted, covering the area of the broad transmission beam which was judged to have been received with the best quality. Referring to FIG. 9(b), it is assumed that transmission beam 74 was judged to have been received with the best quality. Transmission beams 76, 77 have angular spreads of at least 30° so that the area previously covered by transmission beam 74 is now covered transmission beams 76, 77.

If desired, further stages could be carried out to produce successively narrower transmission beams. Once a transmission beam with a sufficiently well defined direction (e.g. to within 30°) has been obtained, the direction of the transmission beam may be adapted in any of the ways described above.

As an alternative to the above technique, the initial beam direction could be obtained by determining the direction of reception of an uplink signal. For example, in co-pending patent application number 0018859.9 in the name of Fujitsu Limited, cited above, a technique is disclosed for obtaining a fast estimate of the direction of arrival of a transmission beam, and this technique could be used to set the initial direction of the downlink transmission beams. In a random access system, the random access channel (RACH) could be used by base station for this purpose.

In the various techniques described above the shape of the transmission beams are determined by the base station. The mobile unit does not need to know the shape of the beams, it only needs to determine which beam was received with the best quality. This reduces the amount of feedback information. Based on the feedback information, the base station adapts the transmission beam pattern as it decides is appropriate.

Second Embodiment of Communication System

A mobile communications system according to a second embodiment will now be described with reference to FIG. 10. The second embodiment is designed to employ both transmit diversity and adaptive antenna techniques. In one kind of transmit diversity technique (referred to as antenna diversity), two or more different transmission antennas or antenna arrays are provided, and the best antenna (or antenna array) for data transmission at any given time is selected. The different antennas (or arrays) may be spaced apart at different positions or may have different orientations. In this way, if the transmission path from one of the transmitters is blocked or undergoing adverse conditions such as deep fade, the other transmitter may be used for transmission. If information about the relative quality of the signals from the two transmitters is available, instead of simply selecting one of the antennas, the system can be improved by using maximum ratio combining at the transmitter, where each transmitter is given an appropriate complex weighting (i.e. amplitude and phase).

Figure 10:
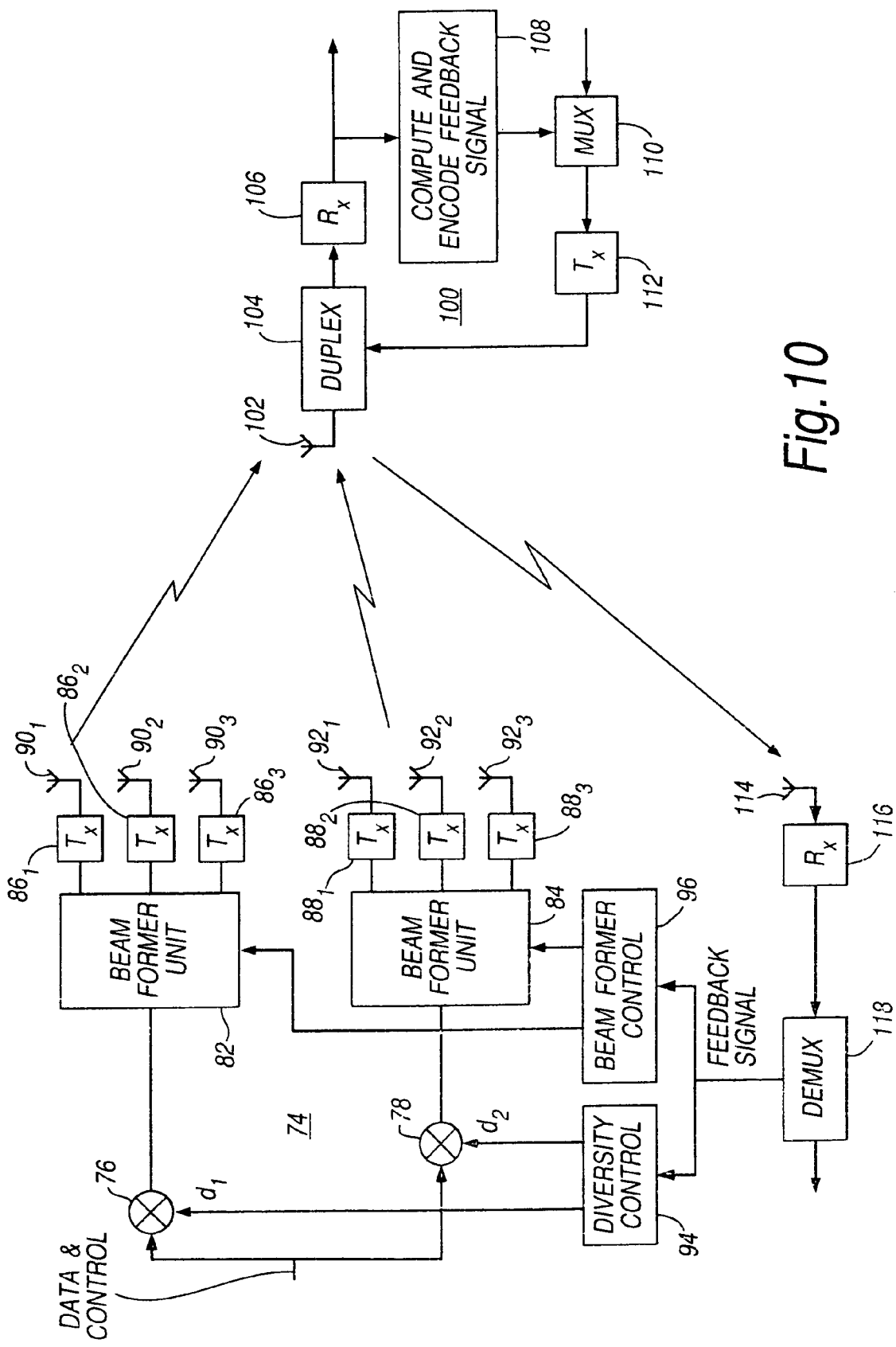
FIG. 10 shows parts of a mobile communications system according to a second embodiment of the invention.

Referring to FIG. 10, the base station of the second embodiment comprises a first beam former unit 82 and a second beam former unit 84, a first set of transmitters 86$_1$, 86$_2$, 86$_3$ and a second set of transmitters 88$_1$, 88$_2$, 88$_3$, and a first array of antenna elements 90$_1$, 90$_2$, 90$_3$ and a second array of antenna elements 92$_1$, 92$_2$, 92$_3$. The first and second arrays of antenna elements are physically separate from each other, so that two separate diversity antennas are formed. Alternatively, the two diversity branches, or the two antenna arrays, can be based on the same physical antennas using polarisation diversity.

In operation, a signal to be transmitted to a mobile unit is separated into two diversity branches. In the first diversity branch complex multiplier 76 multiplies the signal by a first complex diversity weight d$_1$; in the second diversity branch complex multiplier 78 multiplies the signal by a second complex diversity weight d$_2$. The outputs of multipliers 76, 78 are fed to beam former units 82, 84. Each of the beam former units 82, 84 modifies the signal at its input such that, when the signal is transmitted by the respective antenna elements, a set of directional transmission beams is produced. In this way, a set of, for example, three directional transmission beams is produced by each of the diversity transmitters. As in the first embodiment, each of the directional transmission beams has some distinctive characteristic, such that the various transmission beams may be distinguished from each other. In this case, the distinguishing characteristics allow both transmission beams from one diversity transmitter to be distinguished from each other, and transmission beams from different diversity antennas to be distinguished from each other.

At the mobile unit 100 the various beams are received by antenna 102 and passed via duplexer 104 to receiver 106, which down-converts the signals to an intermediate frequency or baseband, and digitizes the down-converted signals. The received signals are then passed to compute and encode unit 108. The compute and encode unit separates out the received signal for each of the various transmission beams, estimates a predetermined quality (e.g. RSS, SINR, BER, FER etc.) of the received signal of each of the transmission beams, and encodes feedback information based on the quality measures for the beams. The output of compute and encode unit 108 is fed to multiplexer 110 to be inserted as a feedback signal into an uplink signal for transmission from the mobile unit 100 to base station 74.

At the base station 74, the uplink signal transmitted from the mobile unit 100 is received by antenna 114 and processed by receiver 116 to produce a received signal. The received signal is passed to demultiplexer 118 which separates out the feedback signal produced by compute and encode unit 108 in mobile unit 100. The feedback signal is then passed to diversity control unit 94 and beam former control unit 96. The diversity control unit adjusts the weights of the two diversity branches in accordance with the feedback signal, and the beam former control unit adjusts the point directions of transmission beams from each of the diversity branches, so as to optimise the performance of the system.

In the second embodiment described above, the feedback signal contains information for both transmit diversity control (to adjust the diversity weights) and transmission beam direction control (to adjust the beam former weights). If the diversity weights are to be set on a maximum ratio basis, then information about the relative quality of the transmission signals from the two transmitters needs to be fed back to the base station. In order to accommodate the additional feedback information, time multiplexing techniques may be used for the feedback signal, in which case the feedback information is supplied over several time slots, with changes being made at intervals of several time slots.

For example, the frame format shown in FIG. 3 may be used for the uplink transmission, and the feedback signal may be contained in the feedback information bits FBI. The feedback information may be time-multiplexed so that, in each time slot, an indication of the relative quality of one of the transmission beams (referred to herein as the beam quality indicator) is fed back to the base station using whatever feedback bits are available. For example, if two feedback bits are available, then in any one time slot a two bit beam quality indicator in respect of one of the transmission beams is fed back. Beam quality indicators in respect of the other transmission beams are fed back in other time slots. From the beam quality indicators, the diversity control unit and the beam former control unit can determine the appropriate diversity weights and beam former weights. Coding techniques may be applied to the feedback signals in order to reduce detection errors.

The frequency with which the beam quality indicator of any particular transmission beam is fed back may either be fixed, or adjusted, for example according to the radio environment. Generally speaking, the fading speed of the radio channel (necessitating control of the diversity weights) is higher than the angular speed of the mobile unit (necessitating control of the beam formers), so a greater priority can be given to those beam quality indicators which are needed for transmitter diversity.

As an example, it is assumed that there are two diversity branches and each has three beams for beam forming. For convenience the beam quality indicators for the six beams are denoted a1, a2, a3 and b1, b2 and b3. The beam quality indicators are transmitted in each time slot on a time multiplex basis to the base station using the FBI bits in the frame format shown in FIG. 3. Assuming that the middle beams associated with a2 and b2 are the strongest, the feedback signal for each individual beam can be arranged in the following order:

| | |
|---|---|
| a1, a2, a3, b1, b2, b3 | (initial phase) |
| a2, b2, a2, b2, a2, b2, a1 | |
| a2, b2, a2, b2, a2, b2, a3 | (cycle 1) |
| a2, b2, a2, b2, a2, b2, b1 | |
| a2, b2, a2, b2, a2, b2, b3 | |
| a2, b2, a2, b2, a2, b2, a1 | |
| a2, b2, a2, b2, a2, b2, a3 | (cycle 2) |
| a2, b2, a2, b2, a2, b2, b1 | |
| a2, b2, a2, b2, a2, b2, b3 | |

Thus, within each cycle of 28 slots, the beam quality indicators for the middle beams are each fed back 12 times and the beam quality indicators for the outer beams are each fed back once. In this way, greater priority is given to the feedback information for transmitter diversity, since the fading speed of a transmission beam is likely to be higher than the angular speed of a mobile unit. The order and relative frequencies of the feedback signals may be changed to optimise the system. For example, a fast moving mobils unit may require beam quality indicators for the outer beams to be fed back more frequently.

Since beam quality indicators are available for all beams, the various transmission beams which are used for beam forming could carry the data channels on a maximum ratio basis, if desired.

Figure 11:
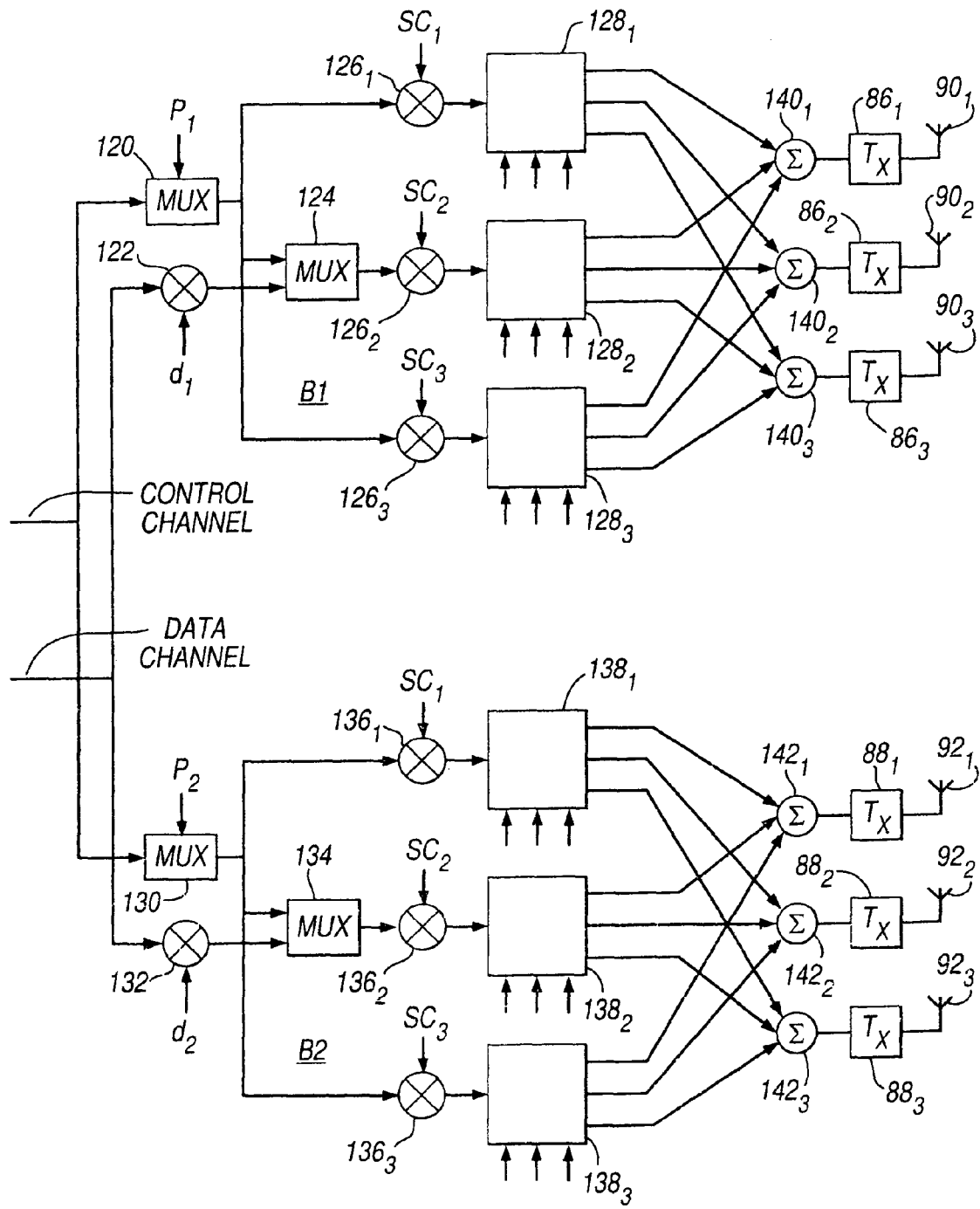
FIG. 11 is a block diagram of parts of a transmitting apparatus in the second embodiment of the invention.

Details of a transmitting apparatus for use in the base station of the second embodiment are shown in FIG. 11. A first diversity branch B1 comprises multiplexer 120, multiplier 122, multiplexer 124, multipliers $126_1$, $126_2$, $126_3$, beam formers $128_1$, $128_2$, $128_3$, summers $140_1$, $140_2$, $140_3$, transmitters $86_1$, $86_2$, $86_3$ and antenna elements $90_1$, $90_2$, $90_3$. A second diversity branch B2 comprises multiplexer 130, multiplier 132, multiplexer 134, multipliers $136_1$, $136_2$, $136_3$, beam formers $138_1$, $138_2$, $138_3$, summers $142_1$, $142_2$, $142_3$, transmitters $88_1$, $88_2$, $88_3$ and antenna elements $92_1$, $92_2$, $92_3$.

In operation the transmitting apparatus takes as inputs a control channel and a data channel destined for a mobile unit. The control channel and the data channel are fed to each of the two diversity branches B1 and B2.

In the first diversity branch B1 a first pilot signal $p_1$ is inserted into the control channel by multiplexer 120. Multiplier 122 multiplies the data channel by a first complex weight $d_1$. The outputs of multiplexer 120 and multiplier 122 are multiplexed in multiplexer 124, to give a multiplexed data and control channel. The multiplexed channel is then fed to multiplier $126_2$, while the control channel is fed to multipliers $126_1$, and $126_3$. Each of the multipliers $126_1$, $126_2$ and $126_3$ scrambles the signal at its input with a respective scrambling code $SC_1$, $SC_2$, $SC_3$. The scrambling code for each signal is different; so that the respective signals are distinguishable from each other. The outputs of multipliers $126_1$, $126_2$ and $126_3$ are fed to respective beam formers $128_1$, $128_2$ and $128_3$. Each beam former modifies the signal at its input such that, when the signal is transmitted by the associated antenna elements, a directional transmission beam is produced. In this way, three directional transmission beams are produced by the first diversity branch B1 for use in controlling the direction of transmission of the first diversity antenna.

In the second diversity branch B2 a second pilot signal $p_2$ is inserted into the control channel by multiplexer 130. Multiplier 132 multiplies the data channel by a second complex weight $d_2$. The outputs of multiplexer 130 and multiplier 132 are multiplexed in multiplexer 134, to give a multiplexed data and control channel. The multiplexed channel is then fed to multiplier $136_2$, while the control channel is fed to multipliers $136_1$ and $136_3$. Each of the multipliers $136_1$, $136_2$ and $136_3$ scrambles the signal at its input with a respective scrambling code $SC_1$, $SC_2$, $SC_3$. These codes are the same as the corresponding codes in the first diversity branch B1. The outputs of multipliers $136_1$, $136_2$ and $136_3$ are fed to respective beam formers $138_1$, $138_2$ and $138_3$ Each beam former modifies the signal at its input such that, when the signal is transmitted by the associated antenna elements, a directional transmission beam is produced. In this way, three directional transmission beams are produced by the second diversity branch for use in controlling the direction of transmission of the second diversity antenna.

The diversity weights $d_1$ and $d_2$ are set by a diversity control unit (unit 94 in FIG. 10) while the weights of the beam formers $128_1$, $128_2$, $128_3$, $138_1$, $138_2$, $138_3$ are set by a beam former control unit (unit 96 in FIG. 10). Beam formers $128_1$, $128_2$, $128_3$, $138_1$, $138_2$, $138_3$ have the same construction as beam formers $30_U$, $30_M$, $30_L$ described above with reference to FIG. 7, and thus the construction of the beam formers is not shown in FIG. 11.

Within each diversity branch B1 or B2 the three scrambling codes $SC_1$, $SC_2$, $SC_3$ are used to distinguish the three transmission beams output by the corresponding diversity antenna array. The first diversity branch B1 is distinguished from the second diversity branch B2 through the use of a different pilot signal in each diversity branch. In this way a mobile unit can distinguish each transmission beam from each diversity antenna.

Figure 12:
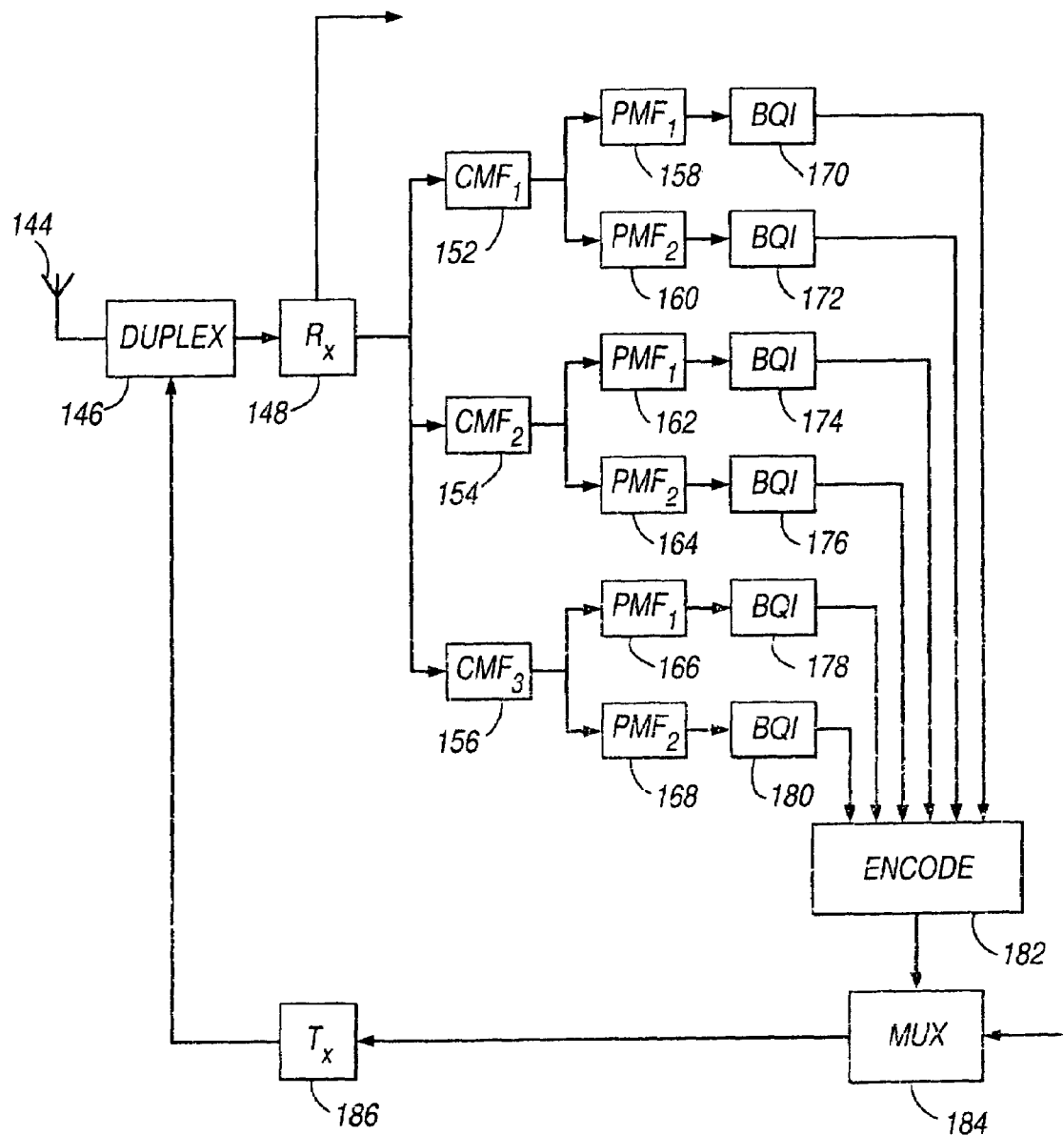
FIG. 12 is a block diagram of parts of a receiving apparatus in the second embodiment of the invention.

FIG. 12 shows details of a mobile unit for use in the second embodiment. The mobile unit comprises antenna 144, duplexer 146, receiver 148, matched filters 152, 154, 156, 158, 160, 162, 164, 166, 168, beam quality indicators 170, 172, 174, 176, 178, 180, encoder 182, multiplexer 184 and transmitter 186. In operation, transmission beams from the transmitting apparatus shown. in FIG. 11 are received by antenna 144 and passed to duplexer 146, which separates received and transmitted signals. The radio frequency signals received by antenna 144 are passed to receiver 148, which down-converts the signals to an intermediate frequency or baseband, and digitizes the down-converted signals. The received signals are then passed to matched filters 152, 154, 156. Matched filter 152 is matched to scrambling code $SC_1$, matched filter 154 is matched to scrambling code $SC_2$, and matched filter 156 is matched to scrambling code $SC_3$. Each matched filter 152, 154, 156 serves to filter out signals with different scrambling codes from the filter's own matching scrambling code. The output of matched filter 152 is fed to matched filters 158, 160, the output of matched filter 154 is fed to matched filters 162, 164, and the output of matched filter 156 is fed to matched filters 166, 168. Matched filters 158, 162, 166 are matched to the first pilot signal (or pilot signal sequence) $p_1$ while matched filters 160, 164, 168 are matched to the second pilot signal (or pilot signal sequence) $p_2$. Each matched filter 158, 160, 162, 164, 166, 168 serves to filter out signals with different pilot signals from the filter's own matching pilot signal. The matched filters 152, 154, 156, 158, 160, 162, 164, 166, 168 thus allow the signals transmitted in the various transmission beams to be separated from each other.

The outputs of matched filters 158, 160, 162, 164, 166, 168 are fed to respective beam quality indicators 170, 172, 174, 176, 178, 180. Each beam quality indicator produces a measure of the quality of the signals transmitted by the corresponding beam. The signal measurements may be the same as those described in relation to the first embodiment. The outputs of the beam quality indicators 170, 172, 174, 176, 178, 180 are fed to encoder 182. Encoder 182 produces a feedback signal in which the various indications of the beam qualities are time multiplexed in accordance with the feedback techniques described above. The feedback signal is fed to multiplexer 60 to be inserted into a signal for transmission from the mobile unit to the base station. At the base station, the feedback signal is used to control the diversity weights $d_1$, and $d_2$ and the beam former weights, as described above with reference to FIGS. 10 and 11.

In the embodiment of FIGS. 10 to 12, transmission beams from different diversity branches are distinguished by different pilot signals, and the various transmission beams from the same diversity branch are distinguished by different scrambling codes. In an alternative embodiment, different scrambling codes could be used for different diversity branches, and different pilot signals could be used for different transmission beams from the same diversity branch. Alternatively, all transmission beams could be allocated different scrambling codes, or all transmission beams could be allocated different pilot sequences. As in the first embodiment, techniques other than scrambling codes or pilot signals may be used for distinguishing the various transmission beams.

The judgement as to whether and how to change the transmission beam pattern may be made at the mobile unit, or at the base station, or elsewhere.

Any of the techniques described above with reference to the first embodiment for adapting the width or direction of the transmission beams may be applied to the second embodiment.

The various embodiments which have been described above may be implemented using software modules running on a processor, for example a digital signal processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

It will be understood that the present invention has been described above purely by way of example, and modifications of detail can be made within the scope of the invention.

The invention is not limited to use with cellular mobile communications systems, but may be applied to any communications system where a signal is transmitted with a certain degree of directionality. The invention may be used with multiplexing techniques other than CDMA, such as Time Division Multiple Access (TDMA), Frequency Division Multiplexing (FDM) or any other appropriate multiplexing technique.

Each feature disclosed in the description, and (where appropriate) the claims and drawings may be provided independently or in any appropriate combination.

What is claimed is:

1. Transmitting apparatus which transmits a transmission signal to a receiving apparatus, comprising:
   an antenna array;
   a transmitter array connected to the antenna array;
   a beam former connected to the transmitter array, the beam former being operable to receive a transmission signal and to modify the transmission signal such that the antenna array produces a plurality of transmission beams in accordance with a transmission beam pattern, at least one of the transmission beams carrying the transmission signal, each transmission beam being distinguishable from each other and, when said receiving apparatus receives a plurality of transmission beams, each received transmission beam being distinguishable from another transmission beam received by said receiving apparatus;
   a receiver operable to receive from the receiving apparatus a feedback signal based on measures of a quality of the transmission beams received at the receiving apparatus; and
   a processor operable to control the beam former such that the transmission beam pattern is adjusted in dependence on the feedback signal;
   wherein the plurality of transmission beams comprises a main beam carrying the transmission signal and at least one auxiliary beam having an angular direction offset from that of the main beam; and
   wherein the processor is operable to adjust the angular direction of the beam pattern by a predetermined adjustment amount in the direction of an auxiliary beam when the feedback signal indicates that that auxiliary beam has best quality.

2. Transmitting apparatus according to claim 1 wherein an angular direction of the beam pattern is adjusted in dependence on the feedback signal.

3. Transmitting apparatus according to claim 1 wherein the feedback signal has one of a limited number of states.

4. Transmitting apparatus according to claim 1 wherein the feedback signal comprises n bits, and the number of transmission beams is less than or equal to $2^n$.

5. Transmitting apparatus according to claim 1 wherein the feedback signal comprises measures of the quality of each of the transmission beams.

6. Transmitting apparatus according to claim 5 wherein the receiver is operable to receive the quality measures for different beams at different times on a predetermined time division multiplexing basis.

7. Transmitting apparatus according to claim 1 wherein the processor is operable to change the angular direction of the main beam to that of an auxiliary beam if the feedback signal indicates that the auxiliary beam was received with better quality than the main beam.

8. Transmitting apparatus according to claim 1 wherein the processor maintains at least one transmission beam unchanged when mating the adjustment to the transmission beam pattern.

9. Transmitting apparatus according to claims 1 wherein a first auxiliary beam is offset in a first direction by a first angular offset from the main beam and a second auxiliary beam is offset in a second direction, by a second angular offset from the main beam.

10. Transmitting apparatus according to claim 1 wherein at least one of the auxiliary beams is transmitted continually.

11. Transmitting apparatus according to claim 1 wherein the plurality of transmission beams comprises at least two auxiliary beams which are transmitted at different respective times.

12. Transmitting apparatus according to claim 1 wherein the transmission signal is carried in at least two transmission beams, and a characteristic of the transmission signals is adjusted in dependence on the feedback signal.

13. Transmitting apparatus according to claim 1 wherein each of the plurality of transmission beams carries a control channel for use in measuring the quality of the transmission beam.

14. Transmitting apparatus according to claim 1 further comprising a unit which is operable to alter a signal to be carried by one of the transmission beams such that that transmission beam is distinguishable from the other transmission beam or beams.

15. Transmitting apparatus according to claim 1, the apparatus comprising a plurality of beam farmers and a plurality of antenna elements for producing the plurality of transmission beams.

16. Transmit diversity apparatus comprising a plurality of transmit diversity branches operable to transmit a transmission signal to a receiving apparatus using a transmit diversity technique, wherein at least one of the branches comprises:
   an antenna array;
   a transmitter army connected to the antenna array;
   a beam former connected to the transmitter array, the beam former being operable to receive a transmission signal and to modify the transmission signal such that the antenna array produces a plurality of transmission beams in accordance with a transmission beam pattern, at least one of the transmission beams carrying the transmission signal, each transmission beam being distinguishable from each other and, when said receiving apparatus receives a plurality of transmission beams, each received transmission beam being distinguishable from another transmission beam received by said receiving apparatus;
   a receiver operable to receive from the receiving apparatus a feedback signal based on measures of a quality of the transmission beams received at the receiving apparatus; and
   a processor operable to control the beam former such that the transmission beam pattern is adjusted in dependence on the feedback signal;
   wherein the plurality of transmission beams comprises a main beam carrying the transmission signal and at least one auxiliary beam having an angular direction offset from that of the main beam; and
   wherein the processor is operable to adjust the angular direction of the beam pattern by a predetermined adjustment amount in the direction of an auxiliary beam when the feedback signal indicates that that auxiliary beam has best quality.

17. Transmit diversity apparatus according to claim 16 wherein the transmission signal is transmitted simultaneously from at least two transmit diversity branches, and the apparatus further comprises a unit which adjusts a characteristic of transmission signals transmitted from the transmit diversity branches in dependence on the feedback signal.

18. Transmit diversity apparatus according to claim 16 wherein the transmit diversity branches transmit respective transmission begins and the feedback signal comprises measures of the quality the transmission beams.

19. Transmit diversity apparatus according to claim 18 wherein the receiver is operable to receive the quality measures for different beams at different times on predetermined time division multiplexing basis.

20. Transmit diversity apparatus according to claim 16 wherein at least one of the diversity branches transmits a main transmission beam and an auxiliary transmission beam, and the receiver of that branch is operable to receive a measure of the quality of the main transmission beam more frequently than a measure of the quality of the auxiliary beam.

21. A base station for use at a cellular mobile communications system comprising a transmitting apparatus which transmits a transmission signal to a receiving apparatus, the transmitting apparatus comprising:
   an antenna array;
   a transmitter array connected to the antenna array;
   a beam former connected to the transmitter array, the beam former being operable to receive a transmission signal and to modify the transmission signal such that the antenna array produces a plurality of transmission beams in accordance with a transmission beam pattern, at least one of the transmission beams carrying the transmission signal, each transmission beam being distinguishable from each other and, when said receiving apparatus receives a plurality of transmission beams, each received transmission beam being distinguishable from another transmission beam received by said receiving apparatus;
   a receiver operable to receive from the receiving apparatus a feedback signal based on measures of a quality of the transmission beams received at the receiving apparatus; and
   a processor operable to control the beam former such that the transmission beam pattern is adjusted in dependence on the feedback signal;
   wherein the plurality of transmission beams comprises a main beam carrying the transmission signal and at least one auxiliary beam having an angular direction offset from tat of the main beam; and
   wherein the processor is operable to adjust the angular direction of the beam pattern by a predetermined adjustment amount in the direction of an auxiliary beam when the feedback signal indicates that that auxiliary beam has best quality.

22. A communications system comprising transmitting apparatus and a receiving apparatus, the transmitting apparatus comprising:
   an antenna array;
   a transmitter array connected to the antenna array;
   a beam former connected to the transmitter array, the beam further being operable to receive a transmission signal and to modify the transmission signal such that the antenna array produces a plurality of transmission beams in accordance with a transmission beam pattern, at least one of the transmission beams carrying the transmission signal, each transmission beam being distinguishable from each other and, when said receiving apparatus receives a plurality of transmission beams, each received transmission beam being distinguishable from another transmission beam received by said receiving apparatus;

a receiver operable to receive from the receiving apparatus a feedback signal based on measures of a quality of the transmission beams received at the receiving apparatus; and a processor operable to control the beam former such that the transmission beam pattern is adjusted in dependence on the feedback signal, and the receiving apparatus comprising:

a receiver operable to receive a plurality of transmission beams, at least one of the beams carrying a transmission signal;

a processor operable to produce measures of a quality of the transmission beams and to produce a feedback signal based on the measures of the quality of the transmission beams; and a transmitter operable to transmit the feedback signal from the receiving apparatus to the transmitting apparatus;

wherein the plurality of transmission beams comprises a main beam carrying the transmission signal and at least one auxiliary beam having an angular direction offset from that of the main beam; and wherein the processor is operable to adjust the angular direction of the beam pattern by a predetermined adjustment amount in the direction of an auxiliary beam when the feedback signal indicates that that auxiliary beam has best quality.

23. A method of transmitting a transmission signal from a transmitting apparatus to a receiving apparatus, comprising:

transmitting, from the transmitting apparatus to the receiving apparatus, a plurality of transmission beams in accordance with a transmission beam pattern, at least one of the beams carrying the transmission signal, each transmission beam being distinguishable from each other and, when said receiving apparatus receives a plurality of transmission beams, each received transmission beam being distinguishable from another transmission beam received by said receiving apparatus;

receiving the plurality of transmission beams;

producing measures of a quality of the transmission beams;

producing a feedback signal based on the measures of the quality of the transmission beams;

transmitting the feedback signal from the receiving apparatus to the transmitting apparatus; and adjusting the transmission beam pattern in dependence on the feedback signal;

wherein the plurality of transmission beams comprises a main beam carrying the transmission signal and at least one auxiliary beam having an angular direction offset from that of the main beam; and wherein the processor is operable to adjust the angular direction of the beam pattern by a predetermined adjustment amount in the direction of an auxiliary beam when the feedback signal indicates that that auxiliary beam has best quality.

24. Transmitting apparatus for transmitting a transmission signal to a receiving apparatus, comprising:

means for transmitting to the receiving apparatus a plurality of transmission beams in accordance with a transmission beam pattern, at least one of the beams carrying the transmission signal, each transmission beam being distinguishable from each other and, when said receiving apparatus receives a plurality of transmission beams, each receive transmission beam being distinguishable from another received transmission beam;

means for receiving from the receiving apparatus a feedback signal based on measures of a quality of the transmission beams received at the receiving apparatus; and means for adjusting the transmission beam pattern in dependence on the feedback signal;

wherein the plurality of transmission beams comprises a main beam carrying the transmission signal and at least one auxiliary beam having an angular direction offset from that of the main beam; and wherein the processor is operable to adjust the angular direction of the beam pattern by a predetermined adjustment amount in the direction of an auxiliary beam when the feedback signal indicates that that auxiliary beam has best quality.

* * * * *